United States Patent
Ocko et al.

(10) Patent No.: US 8,771,080 B2
(45) Date of Patent: Jul. 8, 2014

(54) SOCIALLY-MEDIATED FLASH SALES

(75) Inventors: Matthew Adam Ocko, Palo Alto, CA (US); Sudhanshu Pintu Sethi, Cupertino, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,821

(22) Filed: Sep. 26, 2011

(65) Prior Publication Data

US 2013/0005438 A1    Jan. 3, 2013

Related U.S. Application Data

(60) Provisional application No. 61/503,603, filed on Jun. 30, 2011.

(51) Int. Cl.
| | | |
|---|---|---|
| *A63F 9/24* | (2006.01) | |
| *G07F 17/40* | (2006.01) | |
| *G06Q 30/06* | (2012.01) | |
| *H04W 4/20* | (2009.01) | |
| *A63F 13/10* | (2006.01) | |
| *A63F 13/12* | (2006.01) | |
| *G07F 17/32* | (2006.01) | |

(52) U.S. Cl.
CPC ............... *G06Q 30/06* (2013.01); *G07F 17/40* (2013.01); *H04W 4/206* (2013.01); *A63F 2300/556* (2013.01); *A63F 13/10* (2013.01); *A63F 13/12* (2013.01); *G07F 17/3255* (2013.01); *A63F 2300/575* (2013.01)
USPC .................................. 463/42; 463/40; 463/41

(58) Field of Classification Search
USPC .................................................. 463/40–42
See application file for complete search history.

(56) References Cited

U.S. PATENT DOCUMENTS

| | | | |
|---|---|---|---|
| 6,826,523 | B1 | 11/2004 | Guy et al. |
| 6,910,186 | B2 | 6/2005 | Kim |
| 6,943,728 | B2 | 9/2005 | Han et al. |
| 6,954,728 | B1 | 10/2005 | Kusumoto et al. |

(Continued)

FOREIGN PATENT DOCUMENTS

WO    WO-2012141919 A1    10/2012

OTHER PUBLICATIONS

"Suggest us to friends, Get Free Merch! This weekend only.", Facebook, May 2010, <http://www.facebook.com/events/117236714978821/>.*

(Continued)

*Primary Examiner* — Justin Myhr
(74) *Attorney, Agent, or Firm* — Schwegman Lundberg & Woessner, P.A.

(57) ABSTRACT

A flash sale mechanic of a virtual game may perform a flash sale transaction based on transaction details for the flash sale transaction. These transaction details may indicate an item for sale, invitation requirements applicable to a player of the virtual game, and transaction requirements applicable to participants of the flash sale transaction. The flash sale mechanic may selectively provide an invitation request to a first player of the virtual game based on the invitation requirements of the flash sale transaction, and may receive acceptance responses from players that choose to participate in the flash sale transaction. The flash sale mechanic may complete the flash sale transaction if it determines that it has received an acceptance response from at least a minimum number of players that are needed to complete the flash sale transaction, and that these players have satisfied the transaction requirements.

28 Claims, 11 Drawing Sheets

(56) References Cited

U.S. PATENT DOCUMENTS

| | | | |
|---|---|---|---|
| 7,263,498 B1 | 8/2007 | Van Horn et al. | |
| 7,425,169 B2 | 9/2008 | Ganz | |
| 7,442,108 B2 | 10/2008 | Ganz | |
| 7,465,212 B2 | 12/2008 | Ganz | |
| 7,534,157 B2 | 5/2009 | Ganz | |
| 7,542,920 B1 | 6/2009 | Lin-lendel | |
| 7,568,964 B2 | 8/2009 | Ganz | |
| 7,577,676 B2 | 8/2009 | Egan et al. | |
| 7,881,963 B2 | 2/2011 | Chudnovsky et al. | |
| 8,190,733 B1 | 5/2012 | Hoffman et al. | |
| 2002/0090985 A1 | 7/2002 | Tochner et al. | |
| 2002/0098891 A1* | 7/2002 | Graham et al. | 463/42 |
| 2003/0156134 A1 | 8/2003 | Kim | |
| 2004/0148221 A1 | 7/2004 | Chu | |
| 2005/0137015 A1 | 6/2005 | Rogers et al. | |
| 2005/0137958 A1 | 6/2005 | Huber | |
| 2005/0143174 A1* | 6/2005 | Goldman et al. | 463/42 |
| 2005/0216346 A1 | 9/2005 | Kusumoto et al. | |
| 2006/0190321 A1* | 8/2006 | Martins Nicho et al. | 705/14 |
| 2006/0232605 A1 | 10/2006 | Imamura | |
| 2006/0242017 A1 | 10/2006 | Libes et al. | |
| 2007/0087810 A1* | 4/2007 | Walker et al. | 463/16 |
| 2007/0099701 A1* | 5/2007 | Simon et al. | 463/40 |
| 2007/0265933 A1 | 11/2007 | Steigelfest | |
| 2007/0299734 A1 | 12/2007 | Lee et al. | |
| 2008/0071594 A1 | 3/2008 | Morin | |
| 2008/0102947 A1 | 5/2008 | Hays et al. | |
| 2008/0167106 A1 | 7/2008 | Lutnick | |
| 2009/0063983 A1 | 3/2009 | Amidon | |
| 2009/0069078 A1 | 3/2009 | Nguyen et al. | |
| 2009/0192871 A1* | 7/2009 | Deacon et al. | 705/10 |
| 2009/0215469 A1* | 8/2009 | Fisher et al. | 455/456.3 |
| 2009/0247282 A1* | 10/2009 | Cheng | 463/25 |
| 2009/0281926 A1 | 11/2009 | Lin-Hendel | |
| 2009/0292599 A1* | 11/2009 | Rampell et al. | 705/14.13 |
| 2010/0016080 A1 | 1/2010 | Garden et al. | |
| 2010/0016083 A1 | 1/2010 | Bruce | |
| 2010/0017283 A1 | 1/2010 | Hamilton, II et al. | |
| 2010/0023406 A1 | 1/2010 | Bhogal et al. | |
| 2010/0131355 A1 | 5/2010 | Kitchen et al. | |
| 2010/0161788 A1 | 6/2010 | Boss et al. | |
| 2010/0205035 A1 | 8/2010 | Baszucki et al. | |
| 2010/0216553 A1* | 8/2010 | Chudley et al. | 463/42 |
| 2010/0273553 A1 | 10/2010 | Zalewski | |
| 2010/0311496 A1* | 12/2010 | Taylor et al. | 463/25 |
| 2010/0318919 A1* | 12/2010 | Murphy et al. | 715/745 |
| 2010/0332331 A1 | 12/2010 | Etchegoyen | |
| 2011/0124399 A1* | 5/2011 | Dutilly et al. | 463/25 |
| 2011/0130188 A1* | 6/2011 | Walker et al. | 463/17 |
| 2012/0036015 A1* | 2/2012 | Sheikh | 705/14.54 |
| 2012/0066040 A1 | 3/2012 | Farraro et al. | |
| 2012/0264511 A1 | 10/2012 | Marsland et al. | |
| 2012/0264520 A1 | 10/2012 | Marsland et al. | |
| 2013/0006734 A1 | 1/2013 | Ocko et al. | |

OTHER PUBLICATIONS

Goad, L., "FarmVille McDonalds promotion is a glorified ad #notlovinit", [online]. AOL Inc., Oct. 7, 2010 [retrieved on Mar. 24, 2011]. Retrieved from the Internet: <URL: http://blog.games.com/2010/10/07/farmville-mcdonald-promotion-is-live-for-one-day-only/>, 2 pgs.

Osborne, J., "FarmVille gets the Farmers Insurance blimp to protect your crops, win a ride on it", [online]. AOL Inc., Oct. 18, 2010 [retrieved on Mar. 24, 2011]. Retrieved from the Internet: <URL: http://blog.games.com/2010/10/18/farmville-gets-the-farmers-insurance-blimp-to-protect-your-crops/>, 2 pgs.

\* cited by examiner

SOCIALLY-MEDIATED FLASH SALES

CLAIM OF PRIORITY

This application claims the benefit of U.S. Provisional Application No. 61/503,603, filed Jun. 30, 2011, entitled "SOCIALLY-MEDIATED FLASH SALES," which is incorporated herein by reference in its entirety.

TECHNICAL FIELD

The present disclosure relates to providing flash sale transactions in games and applications. In an example embodiment, a flash sale mechanic is provided to facilitate player participation and collaboration in flash sale transactions of computer-implemented virtual games.

BACKGROUND

Some web applications implement deal services that allow a merchant to offer an item for sale at a discounted price for a predetermined time period. These services may display this deal (e.g., a deal of the day) to users that visit their web site, and may communicate this deal (e.g., via email) to users that have subscribed to their service. A user may visit the web site that provides deal services, and may subscribe to become a member. Then, as a member, the user may receive daily notifications for that day's special deal, and may purchase the deal through the web site.

However, to make the deal services worthwhile to the merchant, these services may promote a single sale item (or a few sale items) at a time to its users so that the merchant's deal gains massive exposure. For example, a user visiting a web site that provides deal services may select a city from which to view special deals, and this user may be presented with an opportunity to purchase a sale item at a discounted rate from a merchant that is local to this city. Unfortunately, while these deal services are designed to provide a large number of new customers to a merchant, these deal services don't do enough to create a social environment around a sale item where members of this environment are encouraged to interact.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
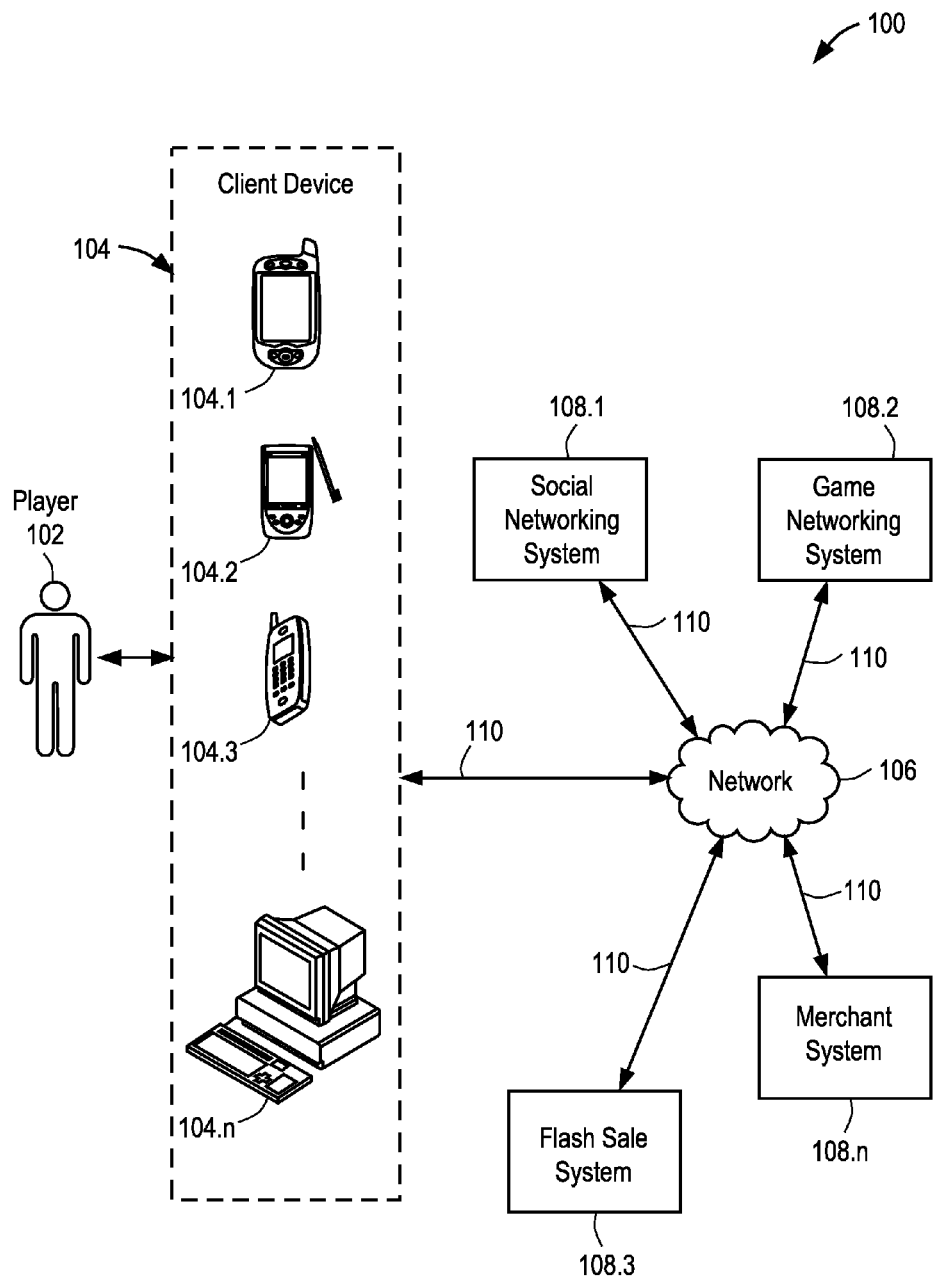
FIG. 1 illustrates an example of a system for implementing various example embodiments.

Various example embodiments provide a game server that hosts a virtual game, and that may promote an item for sale by providing a flash sale transaction to a plurality of players of the virtual game. The player may purchase the item if a determinable number of players have indicated an interest to purchase the item before a transaction deadline of the flash sale transaction.

The virtual game, for example, may include a virtual environment that may resemble city, a farm, a café, or the like. A player may advance in the virtual game by placing virtual objects on a virtual landscape of the virtual game (e.g., a virtual city). These virtual objects may elevate the player's status within the virtual game (e.g., they may provide the player with experience needed to advance to a higher game level), and the player may periodically collect virtual goods and/or virtual currency from certain virtual objects. For example, the player may purchase a farm plot, and may use the plot to grow a crop that provides the player with virtual coins, virtual goods, and/or experience when the player harvests the crop. The player may also purchase virtual goods that the player may use to complete an in-game challenge or an in-game objective. For example, the player may purchase ketchup within the virtual game, and may use the ketchup to prepare hamburgers for customers of a virtual café.

At some point during game play, a player may reach a game state that makes it difficult to advance within the virtual game. For example, the player may not have sufficient virtual currency to purchase a virtual structure (e.g., a city hall) that would allow the player to increase the population of the virtual city (e.g., by building additional housing within the virtual city). In some example embodiments, the game server may provide the player with an opportunity to participate in a flash sale transaction that would allow the player to purchase a desired virtual object at a discounted price. The game server may, for example, allow the player to purchase a city hall at a discounted price if the player satisfies certain criteria (e.g., constraints, or requirements) of the flash sale transaction (e.g., if the player refers the flash sale transaction to a determinable number of other players, or refers the virtual game to a determinable number of real-world friends).

In some example embodiments, a brand can have a presence within this virtual game. An advertiser may provide the game server with a description of a branded virtual object or a branded virtual good that is to be made available to players of the virtual game. For example, a player that is managing a virtual café may purchase a Heinz® brand of ketchup for the virtual game that, when used to prepare a hamburger within the virtual café, may increase the value of the hamburger (with respect to the value of a hamburger that is prepared using unbranded ketchup). Thus, players of the virtual game may purchase branded virtual objects to indicate their brand preferences, and to obtain the features and benefits provided by these branded virtual objects.

In some example embodiments, an advertiser may increase its presence within the virtual game (and may promote brand loyalty with players of the virtual game) by incentivizing players to purchase its brand of a virtual object. The advertiser, for example, may increase its brand's presence within the virtual game by using a flash sale transaction to offer its branded virtual object to select players at a discounted rate. The advertiser may also use a flash sale transaction to increase its business, for example, by providing a digital coupon to players of the virtual game. A player that participates in this flash sale transaction may receive the digital coupon, and may redeem this digital coupon against the price of a physical good or a service associated with the brand. In an example embodiment, the flash sale transaction/opportunity is auctioned to a plurality of advertisers. Accordingly, an advertiser with the highest bid for any particular flash sale opportunity may be selected. The auctioning of the flash sale opportunities may take place in an automated manner.

The flash sale transaction may have transaction requirements that need to be satisfied for a participating player to be allowed to purchase the item for sale. For example, a determinable number of players may need to indicate, within a determinable time period, that they are interested in purchasing the item for sale. In some example embodiments, the transaction requirements may indicate conditions that are applicable to a player of the virtual game (as opposed to the flash sale transaction as a whole), and that need to be satisfied by this player for the player to be allowed to purchase the item for sale. As an example, the transaction requirement may indicate that the player needs refer a determinable number of friends to the flash sale transaction within a determinable time period. As another example, the transaction requirement may indicate that the player needs to visit a physical location (e.g., a location associated with the advertiser, such as a showroom, or an event hosted by the advertiser) within the determinable time period.

Example System

FIG. 1 illustrates an example of a system 100 for implementing various example embodiments. In some embodiments, the system 100 comprises a player 102, a client device 104, a network 106, a social networking system 108.1, a game networking system 108.2, a flash sale system 108.3, and one or more merchant systems (e.g., a merchant system 108.n). The components of the system 100 may be connected directly or over the network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

FIG. 1 illustrates an example of a system 100 for implementing various example embodiments. In some embodiments, the system 100 comprises a player 102, a client device 104, a network 106, a social networking system 108.1, a game networking system 108.2, a flash sale system 108.3, and one or more merchant systems (e.g., a merchant system 108.n). The components of the system 100 may be connected (110) directly or over the network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The social networking system 108.1 may include a network-addressable computing system that can host one or more social graphs (see, for example, FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2.

The flash sale system 108.3 may be a network-addressable computing system that can host flash sale transactions within the virtual game. For example, the flash sale system 108.3 may receive campaign details (e.g., a sale item, a date range, and other data used to customize the flash sale transaction) from the merchant system 108.n, and the flash sale system 108.3 may host the flash sale transaction for the merchant system 108.n to promote the sale item.

Furthermore, the merchant system 108.n may include a network-addressable computing system that can submit campaign details to the flash sale system 108.3. The merchant system 108.n may be associated with a brand (e.g., a company that desires to promote one or more of its products to players of the virtual game) or may be associated with an advertising agency that represents one or more brands. The merchant system 108.n may generate campaign details that describe how the flash sale transaction is to promote an item for sale, and may provide these campaign details to the flash sale system 108.3 via the network 106. The flash sale system 108.3 and the merchant system 108.n may be accessed by the other components of system 100 (e.g., the game networking system 108.2) either directly or via the network 106. In some example embodiments, the game networking system 108.2 may include the flash sale system 108.3.

Although FIG. 1 illustrates a particular example of the arrangement of the player 102, the client device 104, the social networking system 108.1, the game networking system 108.2, the flash sale system 108.3, the merchant system 108.n, and the network 106, this disclosure includes any suitable arrangement or configuration of the these components of system 100.

Figure 2:
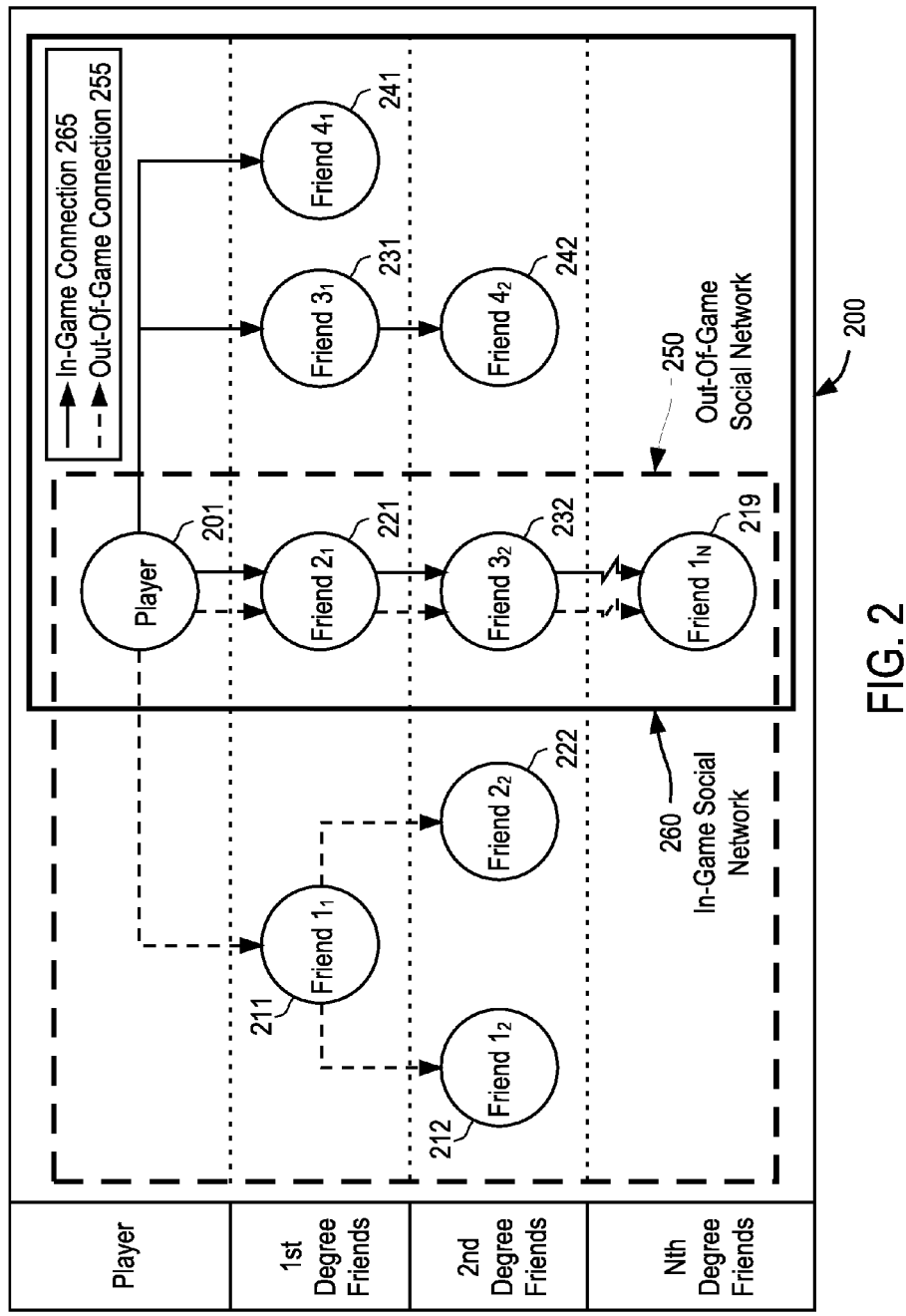
FIG. 2 shows an example of a social network within a social graph.

FIG. 2 shows an example of a social network within a social graph 200. Social graph 200 is shown by way of example to include an out-of-game social network 250 (e.g., a social network associated with the social networking system 108.1), and to include an in-game social network 260 (e.g., a social network associated with the virtual game of the game networking system 108.2). Moreover, in-game social network 260 may include one or more players who are friends with Player 201 (e.g., Friend 231), and may include other players who are not friends with Player 201. In some example embodiments, the Player 201 may participate in a flash sale transaction of the virtual game to purchase a virtual good, and may refer the flash sale transaction to a friend of the in-game social network 260 (e.g., to Friend 231).

Flash Sale Mechanic

In some example embodiments, the flash sale system 108.3 may implement a flash sale mechanic for the virtual game. The flash sale system 108.3 may receive a description for a flash sale transaction from a merchant or from the game networking system 108.2, and the flash sale mechanic may process flash sale transactions based on this description. For example, the description may indicate an item for sale, and may indicate criteria that is used to determine players of the virtual game that may be invited to the flash sale transaction (e.g., invitation requirements), and criteria (e.g., transaction requirements) to determine the participating players of the flash sale transaction that are allowed to purchase the item for sale.

Moreover, the game networking system 108.2 and/or the flash sale system 108.3 may include a database that stores information about virtual environments and flash sale transactions for the virtual game, which the flash sale mechanic may use to process a flash sale transaction. For example, the game mechanic may use this database to determine which players have satisfied the invitation requirements, and to determine which participants of the flash sale transaction have satisfied the transaction requirements.

Figure 3:
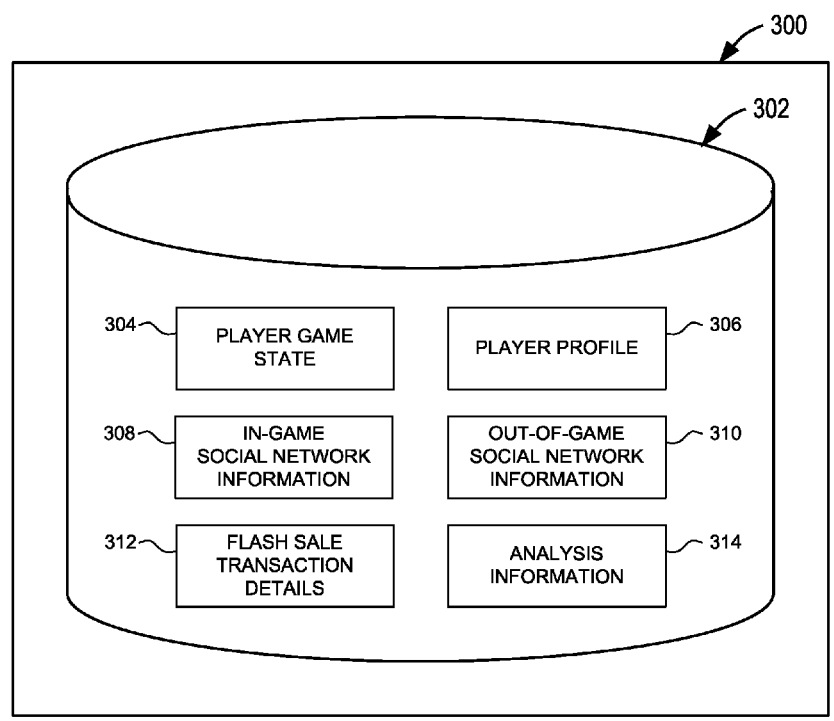
FIG. 3 shows a diagram illustrating example communication between example components of an example system.

FIG. 3 shows an example database system 300 to store information related to virtual environments and flash sale transactions for the virtual game. In some example embodiments, the database system 300 may correspond to the game networking system 108.2 or the flash sale system 108.3 and, accordingly, is described by way of example with reference thereto. In other example embodiments, the database system 300 may correspond to a separate computer system that may be accessed by the game networking system 108.2 and/or the flash sale system 108.3 via a computer network (e.g., the network 106).

The database system 300 may include a database storage 302 that stores information associated with individual players of the virtual game. The database system 300 may receive a search query from the flash sale system 108.3 for a set of players that may be ideal candidates for a certain flash sale transaction, and the database system 300 may process the search query using the database storage 302. In some example embodiments, the database storage 302 may store a player game state 304, a player profile 306, in-game social network information 308, out-of-game social network information 310, flash sale transaction details 312, and analysis information 314.

Player game state 304 may include information about the player's virtual environment, the player's character, or other game-related information. For example, player game state 304 may include virtual objects owned or used by the player (e.g., the player 102 of FIG. 1), placement positions for virtual structural objects in the player's virtual environment, and the like. Player game state 304 may also include in-game obstacles for the player (e.g., new obstacles, current obstacles, completed obstacles, etc.), the player's character attributes (e.g., character health, character energy, amount of coins, amount of cash or virtual currency, etc.), and the like.

The player profile 306 may include user-provided player information that is gathered from the player, his client device (e.g., the client device 104), or an affiliate social network (e.g., the social networking system 108.1). The user-provided player information may include the player's demographic information, the player's location information, the player's localization information (e.g., a list of languages chosen by the player), the types of games played by the player, and the like. The player's location information, for example, may include a historical record of the player's location during game play as determined via a GPS-enabled device or the internet protocol (IP) address for the player's client device 104.

In some example embodiments, the player profile 306 may also include derived player information that may be determined from other information stored in the database storage 302. The derived player information may include information that indicates the player's level of engagement, the player's friend preferences, the player's reputation, the player's pattern of game-play, and the like. For example, the game networking system 108.2 may determine the player's friend preferences based on player attributes that his first-degree friends have in common, and may store these player attributes as friend preferences in the player profile 306. Furthermore, the game networking system 108.2 may determine reputation-related information for the player based on user-generated content (UGC) from the player or his $N^{th}$ degree friends (e.g., in-game messages or social network messages), and may store this reputation-related information in the player profile 306. The derived player information may also include information that indicates the player's character temperament during game play, anthropological measures for the player (e.g., tendency to like violent games), and the like.

The player's level of engagement may be determined from the player's performance within the virtual game. For example, the player's level of engagement may be determined based on a play frequency for the virtual game or for a collection of virtual games. The player's level of engagement may also be determined based on an interaction frequency with other players of the virtual game, a response time for responding to in-game actions from other players of the virtual game, and/or the like.

In some example embodiments, the player's level of engagement may include a likelihood value indicating a likelihood that the player may perform a certain action. For example, the player's level of engagement may indicate a likelihood that the player may purchase a virtual object from the virtual game, may purchase an item from a flash sale transaction in the virtual game, or may complete a new in-game challenge within a determinable period of time from when it is first presented to him.

Further, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player. For example, the game networking system 108.2 may determine the player's likelihood to lead value based on measurements for a number of purchases (and the purchase value) that other players perform after interacting with the player (e.g., a purchase of a virtual good, or from a flash sale transaction).

In some example embodiments, the player profile 306 may also include information about possible triggers (hereinafter referred to as event triggers) that influence the player to perform a certain event. An event trigger may include a trigger description for an in-game action that may influence the player, an event description for an event that the player is likely to perform in response to the in-game action, and a likelihood value for the event. The trigger description may include a multi-dimensional indicator for one or more of the following in-game actions: a character health level for the player's character (e.g., as measured by the player's character health level increasing or decreasing to a certain level, or by a certain amount); an in-game attack; an outcome of the in-game attack; an observation made by the player (e.g., the player's user interface displaying a certain virtual object that a friend of the player has recently purchased, or displaying an in-game advertisement); a comment sent or received by the player (e.g., UGC mentioning a certain virtual good, or a certain flash sale transaction); and the like.

The event description and the likelihood value together may indicate an event likelihood for a certain in-game event that the player may perform in response to experiencing the in-game action. For example, the event likelihood may include a likelihood that the player may invite other players to participate in an in-game quest or a flash-sale transaction, a likelihood that the player may purchase an item from a flash sale transaction, a likelihood that the player may gift a certain virtual object or flash sale item to a friend, and/or the like.

In some example embodiments, the game networking system 108.2 may determine possible triggers and likelihood values for a certain in-game event by analyzing the player game state 304 and the player profile 306 when the player performs this in-game event. The game networking system 108.2 may then generate or update one or more event triggers for this event based on these possible triggers for the player's event. For example, when the player performs this event (or does not perform this event) as the player continues to play the virtual game, the game networking system 108.2 may update likelihood values for event triggers that are specific to this player, thus improving these event triggers' accuracy to predict when the player may perform this in-game event. As another example, when the player performs this event (or does not perform this event), the game networking system 108.2 may also update the likelihood values for event triggers that are applicable to any player of the virtual game, thus improving these event triggers' accuracy to predict when any player (e.g., a new player) may perform this in-game event.

In-game social network information 308 may include information available from the in-game social network, including: the player's set of $N^{th}$ degree friends; UGC that has been generated by the player; UGC that has been directed to the player; UGC that mentions or makes reference to the player; and the like.

The out-of-game social network information 310 may include information from an affiliate social network of which the player is a member, including: the player's profile information from the affiliate social network; the player's set of $N^{th}$ degree friends in the affiliated social network; UGC that has been generated by the player using the affiliated social network; UGC, from a member of the affiliated social network, that has been directed to the player; UGC, from a member of the affiliated social network, that mentions or makes reference to the player; and the like.

The flash sale transaction details 312 may include information about an item that is for sale, information about a merchant that is selling the item, a transaction deadline for the flash sale transaction, an incentive (e.g., a virtual object) to offer to the player, and the like. The flash sale transaction details 312 may also include requirements that are applicable to players of the virtual game. For example, the flash sale transaction details 312 may include an invitation requirement used to determine a player to invite to the flash sale transaction, and a transaction requirement used to determine a participant of the flash sale transaction that may purchase the sale item. The flash sale transaction details 312 may also include an incentive requirement that indicates conditions for awarding the incentive to the player.

In some example embodiments, the incentive requirement may indicate an action that the player needs to perform, before the flash sale transaction is complete, to receive the incentive. For example, the incentive requirement may cause the game networking system 108.2 to award the player with a referral reward (e.g., see the referral reward 418 of FIG. 4) in response to the player referring a friend to the flash sale transaction (e.g., via flash sale referral 416 of FIG. 4). In other example embodiments, the incentive requirement may indicate an action that the user needs to perform, after the flash sale transaction is complete, to receive the incentive. For example, the player may need to collaborate with other participants of the flash sale transaction to achieve an in-game challenge associated with the flash sale item. Then, the incentive requirement may cause the game networking system 108.2 to award an incentive (e.g., see the incentive 428 of FIG. 4) to the player in response to the game networking system 108.2 determining (e.g. via the event notification 426 of FIG. 4) that the player and the other participants achieved the in-game challenge.

The analysis information 314 may include weighted semantic indicators that the game networking system 108.2 may use to interpret the UGC. A semantic indicator may correspond to a word or phrase used in the UGC, and may include a weighted value that indicates a likelihood for a certain meaning and/or tone (e.g., a likelihood that the player's use of the word "bad" in the UGC may be interpreted as "good"). In some example embodiments, the game networking system 108.2 may use the weighted semantic indicators to satisfy a trigger description of a trigger event. For example, the game networking system 108.2 may use the semantic indicators to analyze UGC, and based on the semantic indicators that match the UGC with a high likelihood, the game networking system 108.2 may determine one or more possible trigger events that indicate in-game events that the player is likely to perform (and determine likelihood values related thereto).

Figure 4:
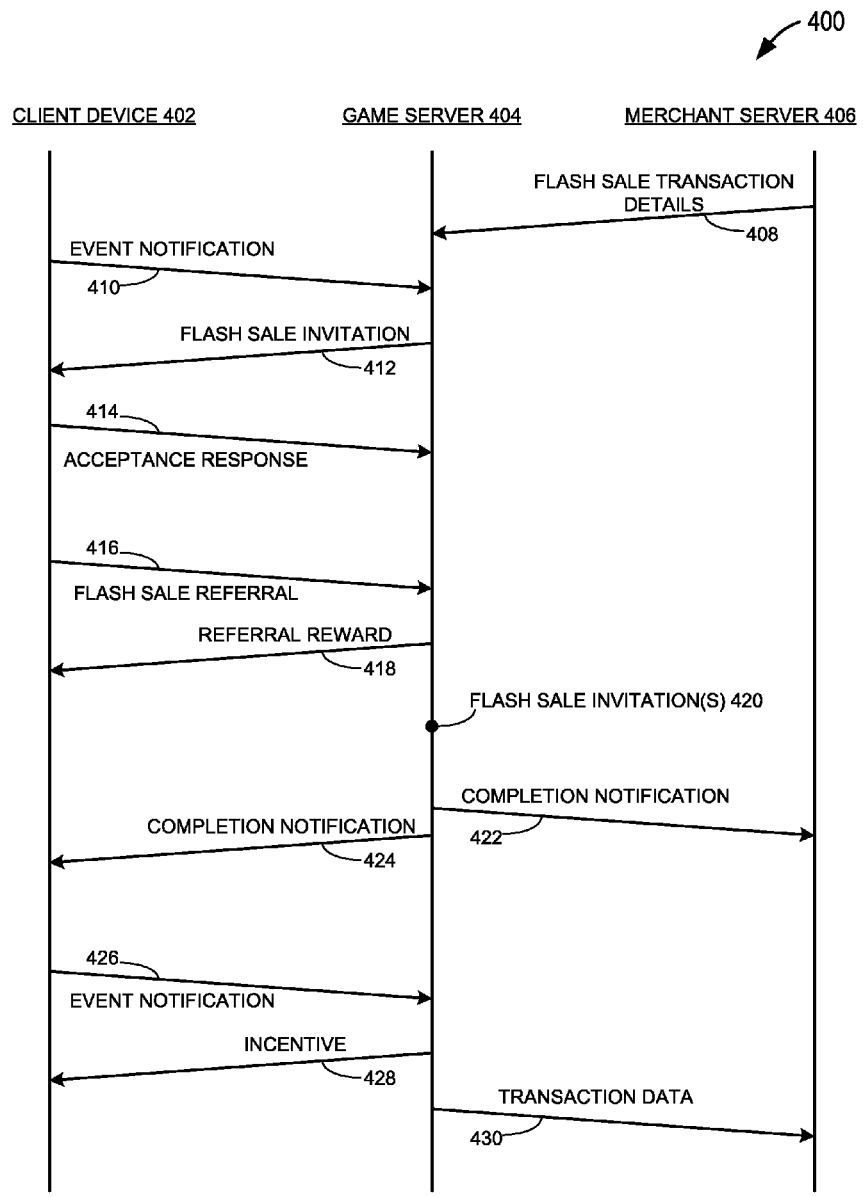
FIG. 4 shows an example database to store information related to virtual environments and flash sale transactions for a computer-implemented virtual game.

FIG. 4 shows a diagram illustrating example communication 400 between example components of an example system. Communication 400 may be performed using one or more of the components of the example system 100 of FIG. 1 and, accordingly, are described by way of example with reference thereto. For example, a client device 402 may correspond to the client device 104, a game server 404 may correspond to the game networking system 108.2 and/or the flash sale system 108.3, and a merchant server 406 may correspond to the merchant system 108.n.

In some example embodiments, the game server 404 may receive flash sale transaction details 408 from the merchant server 406. The transaction details 408 may indicate an item for sale, invitation requirements applicable to a player of the virtual game, and transaction requirements applicable to a participant of the flash sale transaction. The item for sale may be a virtual object, a physical good, or a service that the player may purchase at a discounted price. For example, the item for sale may be a virtual object (e.g., branded virtual structure) that the player may place within his virtual environment (e.g., within a virtual landscape of the virtual game). As a further example, if the player has placed a branded coffee shop in his virtual environment, the player may receive an invitation to participate in a flash sale transaction that promotes a physical good or a service associated with this brand.

The invitation requirements of the flash sale transaction details 408 may indicate criteria that the game server 404 is to use to select a player of the virtual game that is to receive a flash sale invitation 412. In some example embodiments, the invitation requirements may include criteria applicable to the player's game state, or any other information attributed to this player at the game server 404. The invitation requirements may also include criteria applicable to an event notification 410 (e.g., an in-game event, or any event monitored by the client device 402) that the game server 404 may receive from the player's client device 402. If the game server 404 determines that information about the player satisfies the invitation requirements of the flash sale transaction details 408, the game server 404 may send the flash sale invitation 412 to the player's client device 402. If the player is interested in purchasing the item for sale, the game server 404 may receive an acceptance response 414 from the player's client device 402 indicating that the player desires to participate in the flash sale transaction. The game server 404 may allow the player to purchase the item for sale if the player satisfies the transaction requirements of the flash sale transaction within the determinable time period indicated by the flash sale transaction details 408.

In some example embodiments, the invitation requirements may indicate in-game criteria that the player is to satisfy within the virtual game. This criteria, for example, may include an attribute of the player (e.g., a pattern of game play, such as a pace at which the player advances game levels, or an amount of time spent by the player interacting with other players), and may include the player's game state (e.g., a game level, an experience level, an amount of in-game currency, and the like).

Further, the invitation requirements may indicate criteria pertaining to an in-game objective or a virtual object of the virtual game. This criteria, for example, may indicate an in-game objective that the player has completed, or an in-game objective that the player has not yet completed (e.g., an objective that the player needs to complete to advance in the virtual game). This criteria may also indicate a virtual object that the player does not own (e.g., a virtual object that the player may need to complete a certain in-game objective), or may indicate a virtual good that the player consumes at or above a determinable rate.

The invitation requirements may also indicate qualities associated with the player, either within the virtual game or in the real world. For example, the invitation requirements may indicate a minimum level of engagement that the player may have with the virtual game (e.g., as determined by a game engagement metric of the virtual game), or may indicate an association that the player has with other players of the virtual game (e.g., as reflected within relationship data of the virtual game). The invitation requirements may also indicate a physical location associated with the player, such as the latest location, or locations that the player has visited within a predetermined time period (e.g., within the last thirty days). This location information may be provided by the player's client device 402, or may be determined from the network address of the player's client device 402. In some example embodiments, the location information may be received from a third-party social network, such as the social networking system 108.1.

The transaction requirements may indicate criteria that the game server 404 is to use to determine whether the participating player of the flash sale transaction is allowed to purchase the sale item. In some example embodiments, the transaction requirements may indicate criteria pertaining to how the flash sale transaction is to propagate through the player's social network before the player is allowed to purchase the sale item. The transaction requirements may indicate a minimum number of friends (as reflected within relationship data of the virtual game) that the player is to refer to the flash sale transaction. Further, the transaction requirements may indicate a minimum propagation depth (e.g., as reflected within the relationship data) to which at least one referral from the player is to propagate. For example, the game server 404 may receive a flash sale referral 416 from the player's client device 402 indicating that the player is referring one or more friends (e.g., as determined by relationship data of the virtual game) to the flash sale transaction. As a further example, the game server 404 may receive flash sale referrals from other players that have been referred to the flash sale transaction, either directly or indirectly, by the player. The game server 404 may send additional flash sale invitations 420 to other players of the virtual game based on these referrals, or based on determining that other players satisfy the invitation requirements of the flash sale transaction details 408. Other invitation requirements may include flash sales previously accepted by the first player, a speed at which the invitation request was propagated in the virtual game, and a speed at which friends of the player responded to the invitation request.

In some example embodiments, the game server 404 may send a referral reward 418 to the client device 402 after receiving a determinable number of flash sale referrals from the player (e.g., after three referrals). The game server 404 may also send a referral reward 418 to the client device 402 based on flash sale referrals 416 that the game server 404 received from other players that have been referred to the flash sale transaction (either directly or indirectly) by the player. This referral reward 418 may include an in-game award (e.g., an amount of in-game experience points, virtual currency, in-game energy points, or the like), or may include a digital coupon or voucher that is redeemable against the price of a physical good or a service.

Further, the transaction requirements may indicate criteria pertaining to an action that the player is to perform before the game server 404 allows the player to purchase the sale item. For example, the transaction requirements may indicate a physical location that the player is to visit, an in-game objective that the player is to complete, or any action (e.g., a real-world action, or an in-game action) that the player is to perform. The game server 404 may determine whether the player has satisfied the transaction requirements based on information gathered from one or more event notifications 410 from the client device 402, and/or based on information gathered from a third-party online service (e.g., the social networking system 108.1).

In some example embodiments, if the game server 404 determines that the player has satisfied the transaction requirements of the flash sale transaction details 408, the game server 404 may complete the flash sale transaction, for example, by allowing the player to purchase the sale item.

Once the player has purchased the sale item, the game server 404 may send a completion notification 424 to the client device 402. If the item for sale is an in-game object, this completion notification 424 may include this in-game object (e.g., a virtual structure, virtual currency, in-game energy points, or the like). Otherwise, if the item for sale is a real-world item, the completion notification 424 may include a digital coupon or voucher that is redeemable against the price of the real-world item (e.g., a physical good or a service). The game server 404 may also send a completion notification 422 to the merchant server 406. The completion notification 422 may, for example, include demographic information about the players that have purchased the item for sale, and may include other information associated with the flash sale transaction.

The flash sale transaction details 408 may also include information pertaining to an incentivized action that the player may perform to receive an incentive. For example, the flash sale transaction details 408 may indicate incentive requirements that are applicable to the player, and may indicate an incentive (e.g., a virtual good, or a digital coupon redeemable against the price of a physical good or a service) that the player may receive for satisfying the incentive requirements. The incentive requirements, for example, may indicate an action that the player is to perform after accepting the invitation to participate in the flash sale transaction, or may indicate an action that the player is to perform after purchasing the flash sale item.

In some example embodiments, the incentive requirements may indicate criteria pertaining to how the player is to propagate the flash sale transaction through his social network, and the player may receive the incentive for referring other players to the flash sale transaction in a way that satisfies the incentive requirements (e.g., regardless to whether the player satisfies the transaction requirements, or purchases the sale item). For example, the incentive requirements may indicate a minimum number of flash sale referrals 416 that the player is to send to other players of the virtual game, or a total number of other players that have received a referral to the flash sale transaction, either directly or indirectly, from this player.

The incentive requirements may also indicate other actions (e.g., in the virtual game, or in the real world) that the player is to perform after purchasing the sale item. The incentive requirements may indicate a minimum level of engagement that the player may have with the virtual game, or with other players of the virtual game (e.g., as determined by a game engagement metric of the virtual game). As an example, if the player purchases a Starbucks™ brand coffee shop for his virtual environment through a flash sale transaction, the player may receive a challenge (e.g., as defined by the incentive requirements) to have five friends (or any other determinable number of friends) send a tour bus to this coffee shop within twenty four hours (or any other determinable time period). If the player successfully completes this challenge, the player may receive an incentive item, such as a voucher redeemable at a physical Starbucks™ coffee shop for a free drink.

Further, the incentive requirements may indicate a physical location that the player is to visit, or an in-game objective that the player is to complete, within a determinable time period. For example, the player that purchased the Starbucks™ brand virtual coffee shop through the flash sale transaction may receive an incentive from Starbucks™. The incentive requirements for this incentive, for example, may indicate that the player is to visit a physical Starbucks™ coffee shop within a determinable time period (e.g., within the next three days). As another example, the incentive requirements may indicate that the player is to service one thousand customers within twenty four hours using the Starbucks™ brand virtual coffee shop. If the player successfully completes the incentive requirements, the player may receive, for example, a free upgrade to the Starbucks™ virtual coffee shop that the player has just purchased. This upgraded virtual structure may have an upgraded visual representation (e.g., an upgraded image that displays a drive-through Starbucks™ coffee shop), and may have upgraded attributes (e.g., the upgraded virtual structure may provide the player with more coins than the virtual structure being upgraded).

In some example embodiments, if the game server 404 determines that the player has satisfied the incentive requirements of the flash sale transaction details 408 (e.g., based on an event notification 426, or based on the database storage 302), the game server 404 may send the incentive 428 to the client device 402. If the incentive is an in-game object, the incentive 428 may include this in-game object (e.g., a virtual structure, virtual currency, in-game energy points, or the like). Otherwise, if the incentive is a real-world item, the incentive 428 may include a digital coupon or voucher that is redeemable against the price of the real-world item (e.g., a physical good or a service). The game server 404 may also send transaction data 430 to the merchant server 406. The transaction data 430 may include transaction information and player demographic information associated with players that have participated in the flash sale transaction, or have received an invitation to the flash sale transaction. For example, the transaction data 430 may include transaction information associated with the flash sale invitations 412 and 420, the acceptance response 414, the flash sale referral 416, the referral reward 418, and/or the incentive 428.

In some example embodiments, the game server 404 may include the database system 300 to store information related to the player's virtual environment, the player's game state, and flash sale transaction information for the virtual game. The game server 404 may send the flash sale invitation 412 to the client device 402 in response to determining that the player satisfies the invitation requirements based on information stored in the database system 300. Further, the game server 404 may send the referral reward 418, the completion notification 424, and/or the incentive 428 to the client device 402 based on the information stored in the database system 300. The game server 404 may also send the completion notification 422 and/or the transaction data 430 to the merchant server 406 based on the information stored in the database system 300.

Example Flash Sale Transaction Processing

Figure 5:
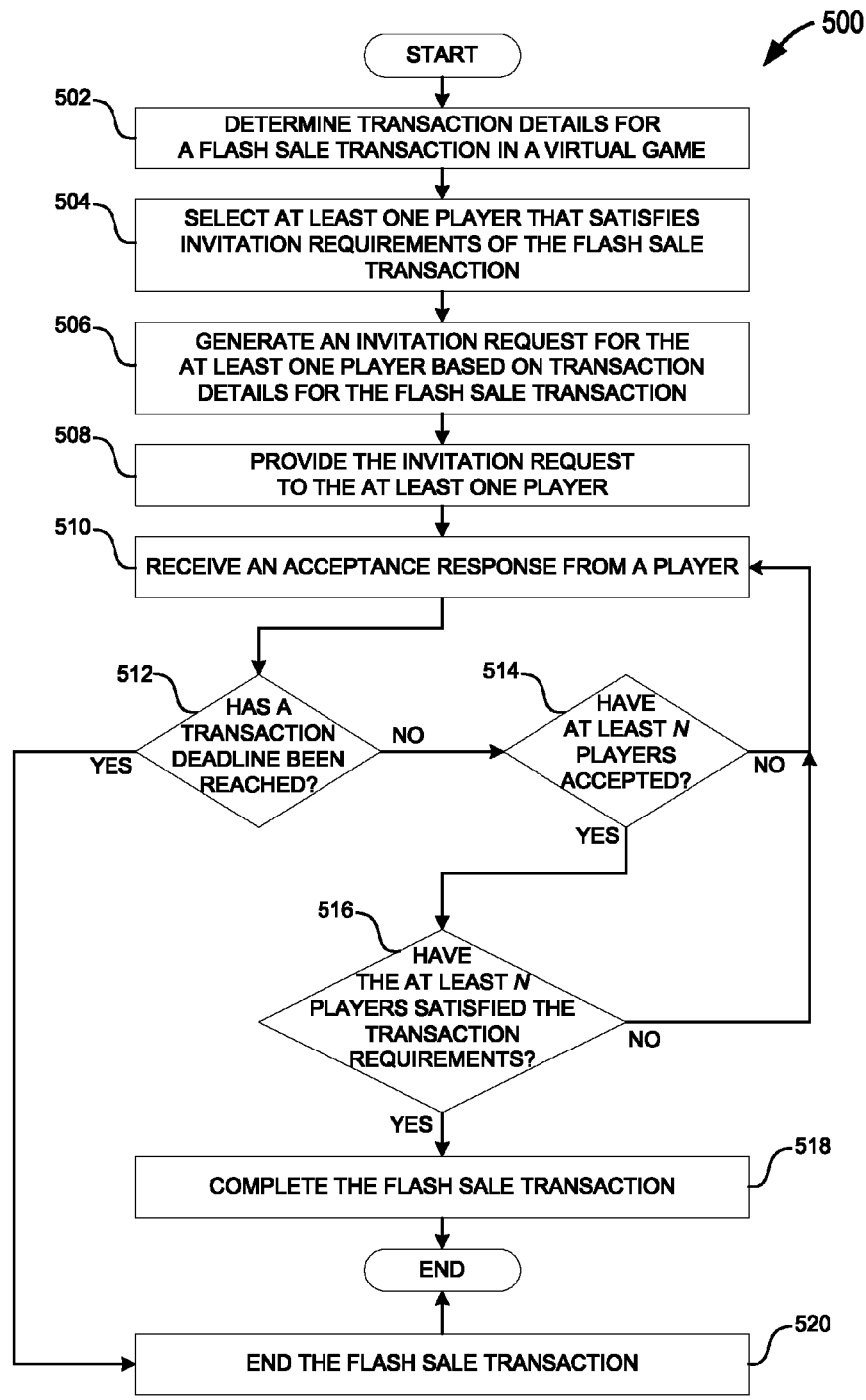
FIG. 5 shows a flowchart illustrating an example method for processing a flash sale transaction in the virtual game.

FIG. 5 shows a flowchart illustrating an example method 500 for processing a flash sale transaction in the virtual game. In some embodiments, the method 500 may be performed using the game networking system 108.2 and/or the flash sale system 108.3, and, accordingly, is described by way of example with reference thereto. The method 500 may begin at operation 502 by determining transaction details for a flash sale transaction in the virtual game. The transaction details may indicate an item for sale, invitation requirements applicable to a player of the virtual game, and transaction requirements applicable to a participant of the flash sale transaction.

At operation 504, the method 500 may select a player that satisfies the invitation requirements of the flash sale transaction. In some example embodiments, the method 500 may select the player based on the invitation requirements of the flash sale transaction. These invitation requirements may indicate criteria that the game networking system 108.2 is to use to select a player of the virtual game that is to receive a flash sale invitation 412. In some example embodiments, the invitation requirements may include criteria applicable to the player's game state, information received about the player (or about an event performed by the player) from the player's client device 104 or from a third party system (e.g., the social networking system 108.1), or any other information attributed to this player that is received at the game networking system 108.2.

The invitation requirements may include criteria indicating that the selected player is to have at least one player attribute in common with one or more participants of the flash sale transaction (e.g., as determined based on the player game state 304, or the player profile 306). As an example, the invitation requirements may indicate that the selected player is to live within the same city or county (or within a determinable distance) as one or more participants of the flash sale transaction. Thus, the flash sale transaction may include like-minded players, or players facing similar in-game obstacles, and the game networking system 108.2 may introduce these players to one another so that they may communicate about the flash sale transaction or the virtual game. Further, the invitation requirements may include criteria indicating that the selected player is to have a play pattern similar to one or more participants of the flash sale transaction (e.g., as determined by a play pattern metric and the player profile 306). Thus, the game networking system 108.2 may introduce these players to one another so that they may collaborate (or compete) within the virtual game. For example, a player (or players) that has been particularly responsive, previously enhanced flash sale success rate (e.g., forwarded an invitation that has been accepted by a recipient thereof), or in any other way increased the likelihood of success of the flash sale may be identified. Other players in the identified player's social graph (e.g., in-game, out-game, local/physical/geo-based, or any permutation thereof) may then also be targeted.

At operation 506, the method 500 may generate an invitation request for the selected player based on transaction details for the flash sale transaction. The invitation request may indicate the transaction requirements that are applicable to the player of the virtual game. At operation 508, the method 500 may provide the invitation request to the selected player (e.g., by sending the flash sale invitation 412 to the player's client device 402). Then, at operation 510, the method 500 may receive an acceptance response from a player of the virtual game that desires to participate in the flash sale transaction (e.g., the acceptance response 414 of FIG. 4). For example, the method 500 may receive an acceptance response from the player that is selected at operation 504. As another example, the selected player may refer a friend (e.g., friend 241 of the in-game social network 260) to the flash sale transaction, and the method 500 may receive an acceptance response from the player's friend.

When the method 500 receives the acceptance response from the player, or when a participant of the flash sale transaction satisfies the transaction requirements, the method 500 may determine whether the flash sale transaction has been completed. For example, the method 500 may complete the flash sale transaction upon determining that it has received an acceptance response from at least N players (e.g., at operation 514), and determining that these N players have satisfied the transaction requirements (e.g., at operation 516). As a further example, the method 500 may end the flash sale transaction if it determines (e.g., at operation 512) that a transaction deadline for the flash sale transaction has been reached before at least N players accepted the flash sale transaction or satisfied the transaction requirements.

For example, when the method 500 receives the acceptance response at operation 510, the method 500 may continue to operation 512 to determine whether the transaction deadline has been reached for the flash sale transaction. If so, the method 500 may continue to operation 520 to end the flash sale transaction. Otherwise, if the method 500 determines that the transaction deadline for the flash sale transaction has not been reached, the method 500 may continue to operation 514 to determine whether a sufficient number of players (e.g., N players) have accepted the invitation for the flash sale transaction.

If the method 500 determines at operation 514 that less than N players are participating in the flash sale transaction, the method 500 may, for example, return to operation 510 to wait for a player join the flash sale transaction. In another example, the method 510 may return to operation 504 to invite another player to the flash sale transaction (e.g., by sending the flash sale invitation(s) 420 of FIG. 4). However, if the method 500 determines at operation 514 that at least N players are participating in the flash sale transaction, the method 500 may continue to operation 516 to determine whether at least N players (e.g., the participants of the flash sale transaction) have satisfied the transaction requirements.

If the method 500 determines at operation 516 that less than N players have satisfied the transaction requirements, the method 500 may, for example, return to operation 510 to wait for another player (that may have satisfied the transaction requirements) to join the flash sale transaction. As another example, whenever the method 500 determines that a participant of the flash sale transaction has performed an action that satisfies the transaction requirements, the method 500 may return to operation 512 to determine whether the transaction deadline has been reached or whether the flash sale transaction is complete. As a further example, the method 500 may return to operation 504 to invite another player that may or may not have satisfied the transaction requirements. The method 500 may continue to operate until the flash sale transaction is complete, or the transaction deadline has been reached.

However, if the method 500 determines at operation 516 that at least N players have satisfied the transaction requirements, the method 500 may continue to operation 518 to complete the flash sale transaction. In some example embodiments, the method 500 may complete the flash sale transaction by processing a sales transaction with the player. For example, the method 500 may receive payment information from the player (e.g., credit card information), and may provide the sale item to the player. If the item for sale is an in-game object, the method 500 may make this in-game object (e.g., a virtual structure, virtual currency, in-game energy points, or the like) available to the player in his virtual environment. Otherwise, if the item for sale is a real-world item, the method 500 may provide the player with a digital coupon or voucher that is redeemable against the price of the real-world item (e.g., a physical good or a service).

In some example embodiments, when the method 500 completes the flash sale transaction, the method 500 may send a bill to the merchant system 108.n. The amount being billed to the merchant system 108.n, for example, may include a determinable amount per items sold through the flash sale transaction (e.g., a fixed amount, or a percentage of the sale price for the item for sale). The amount being billed may also include a determinable amount per player that participated in the flash sale transaction (e.g., charge per acceptance response 414 received by the method 500). In some example embodiments, the amount being billed may also include a determinable amount per player that is presented with the opportunity to participate in the flash sale transaction (e.g., charge per flash sale invitation 412 and 420 sent to the players of the virtual game). In some example embodiments, out-of-band authentication is performed for high value transactions to reduce the likelihood of fraud. Examples of out-of-band authentication include machine-generated techniques (e.g., as Twilio Communications), a telephone call, an SMS-based challenge and response, or any other telephone/smartphone-based technique.

In some example embodiments, the game networking system 108.2 may associate these participating players of the flash sale transaction with an in-game objective of the virtual game, and may provide an incentive to these players so that they collaborate to complete the in-game objective before an expiration date of the incentive. For example, when the method 500 completes the flash sale transaction for a set of participating players that have purchased a community building of the virtual game (e.g., a police station), the game networking system 108.2 may provide these players with an incentive (e.g., virtual currency) to assign a role within this community building to at least one other participating player of the flash sale transaction.

Figure 6:
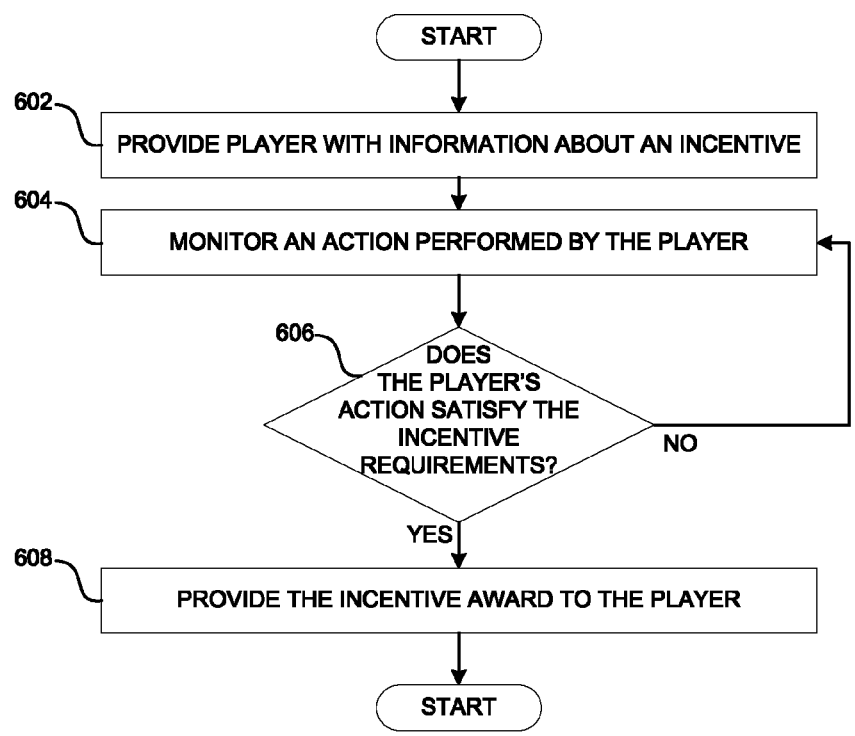
FIG. 6 shows a flowchart illustrating an example method for processing an incentive award for the flash sale transaction.

FIG. 6 shows a flowchart illustrating an example method 600 for processing an incentive award for the flash sale transaction. In some example embodiments, the method 600 may be performed using the game networking system 108.2, and, accordingly, is described by way of example with reference thereto. The method 600 may begin, at operation 602, by providing a player of the virtual game with information about an incentive. In some example embodiments, the method 600 may provide the player with a user interface that informs the player about the incentive being offered to the player (e.g., a virtual good, or a digital coupon redeemable against the price of a physical good or a service). The user interface may also inform the player about the incentive requirements that the player is to satisfy to receive the incentive. For example, for a player that has built a Starbucks™ brand virtual coffee shop in his virtual environment, the user interface may indicate that this player may receive a free drink at Starbucks™ if the player visits a Starbucks™ coffee shop within the next 24 hours.

At operation 604, the method 600 may monitor an action performed by the player (e.g., an in-game action, or a real-world action determined based on data from the client device 104 or the social networking system 108.1). For example, the method 600 may determine that the player visited a Starbucks™ coffee shop after receiving the incentive notification, based on location information (or a network address) received from the player's client device 104, or based on historical location information received about the player from the social networking system 108.1.

At operation 606, the method 600 may determine whether the player's action satisfies the incentive requirements of the flash sale transaction. If the method 600 determines that the player has performed an action that satisfies the incentive requirement, the method 600 may continue to operation 608 to provide the incentive award to the player. In some example embodiments, the method 600 may use the social networking system 108.1 and/or the game networking system 108.2 to post a message about the incentive for the player's friends to see. As an example, when the player receives the free drink by visiting a Starbucks™ coffee shop, the method 600 may post a message indicating that the player has visited the Starbucks™ coffee shop, and the message may also indicate the type of drink that the player chose to receive.

In some example embodiments, if the method 600 determines at operation 606 that the player's action does not satisfy the incentive requirements, the method 600 may return to operation 604 to monitor other actions performed by the player.

Figure 7:
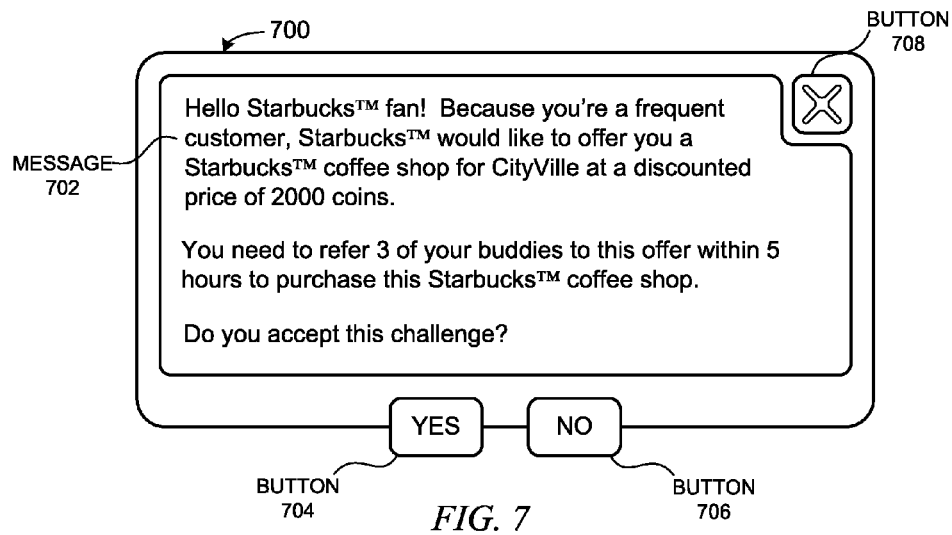
FIG. 7 shows an example user interface to present a flash sale transaction opportunity to a player of the virtual game.

FIG. 7 shows an example user interface 700 to present a flash sale transaction opportunity to a player of the virtual game. In some example embodiments, the user interface 700 may be generated by the game networking system 108.2 and presented to the player 102 by the client device 104, and, accordingly, is described by way of example with reference thereto.

In some example embodiments, the user interface 700 may include a message 702, and a set of buttons 704, 706, and 708. The message 702 may notify the player of the item being sold through the flash sale transaction, and may notify the player of the transaction requirements that the player is to satisfy before he may purchase the sale item. For example, the message 702 may inform the player that he may participate in a flash sale transaction to purchase a Starbucks™ brand virtual coffee shop for his virtual environment at a discounted price of 2000 coins. The message 702 may also inform the player that to complete this purchase, the player needs to refer three friends to this flash sale transaction within five hours.

The buttons 704, 706, and 708 presented with the user interface 700 may allow the player to accept, decline, or dismiss the invitation to the flash sale transaction. For example, the button 704 may allow the player to accept the invitation to the flash sale transaction. Further, the button 706 may allow the player to decline the invitation to the flash sale transaction, which may cause the game networking system 108.2 to not present the player with the user interface 700 at a later date. Also, the button 708 may allow the player to dismiss the invitation to this flash sale transaction, which may allow the game networking system 108.2 to present the user interface 700 to the player at a later date. In an example embodiment, the player may defer responding to an invitation by moving or storing the invitation in a "flash sale inbox". For example, a further button or icon may thus be provided in a GUI that, when sleeted by the player, will move the invitation to the flash sale inbox for subsequent or deferred access by the player. The player may be sent reminders advising the player of an expiry date of the invitation. In some example embodiments, further functionality is provided that allows the player to forward a flash sale invitation to a friend (e.g., a friend in the player's social graph). The player may forward the flash sale invitation to the friend when the player is not interested in participating. However, in some embodiments, both the player and the friend (or any other recipient(s) of the forwarded invitation) may participate in the flash sale.

Figure 8:
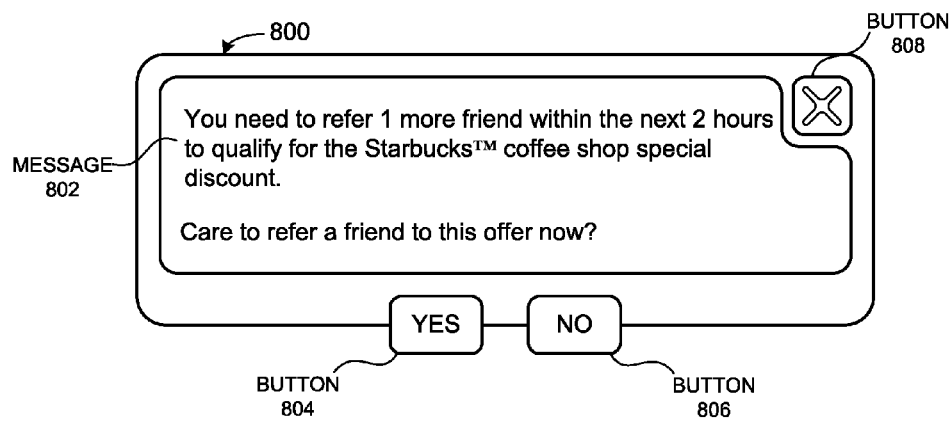
FIG. 8 shows an example user interface to remind the player to refer the flash sale transaction to a friend.

FIG. 8 shows an example user interface 800 to remind the player about the transaction requirements that the player still needs to satisfy to complete the flash sale transaction. In some example embodiments, the user interface 800 may be generated by the game networking system 108.2 and presented to the player 102 by the client device 104, and, accordingly, is described by way of example with reference thereto.

In some example embodiments, the user interface 800 may include a message 802, and a set of buttons 804, 806, and 808. The message 802 may notify the player that the flash sale transaction is not yet complete, and may remind the player of the remaining conditions of the transaction requirements that the player is to satisfy before he may purchase the sale item. For example, the message 802 may inform the player that he needs to refer one more friend within the next two hours to qualify for the Starbucks™ brand virtual coffee shop at the discounted price.

The buttons 804, 806, 808 presented with the user interface 800 may allow the player to accept, decline, or dismiss the reminder to complete the transaction requirements. For example, the button 804 may allow the player to accept the reminder, which may cause the game networking system 108.2 to provide the player with an opportunity to refer the flash sale transaction to a friend. Further, the button 806 may allow the player to decline the reminder, which may cause the game networking system 108.2 to not present the player with the user interface 800 at a later date. Also, the button 808 may allow the player to dismiss the invitation to this flash sale transaction, which may allow the game networking system 108.2 to present the user interface 800 to the player at a later date.

Figure 9:
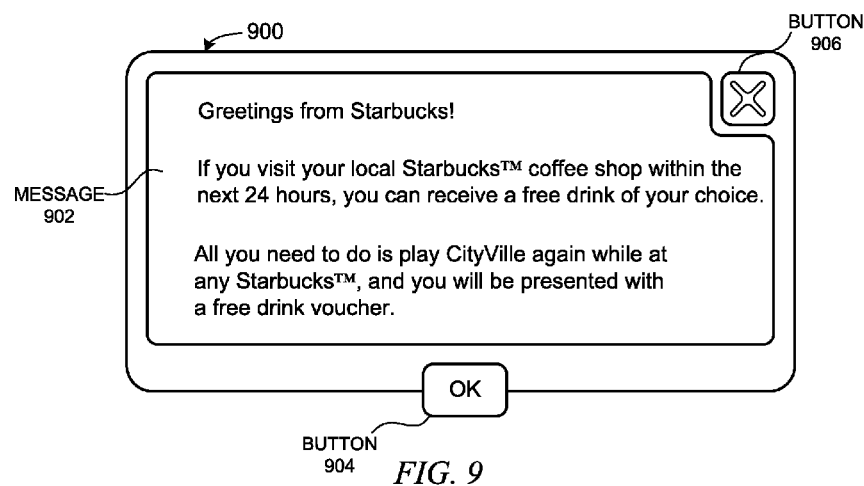
FIG. 9 shows an example user interface to present an incentive to the player of the virtual game.

FIG. 9 shows an example user interface 900 to notify the player of a digital incentive of the virtual game. In some example embodiments, the user interface 900 may be generated by the game networking system 108.2 and presented to the player 102 by the client device 104, and, accordingly, is described by way of example with reference thereto.

In some example embodiments, the user interface 900 may include a message 902, and a buttons 904 and 906. The message 902 may notify the player that he has been selected to receive a digital incentive (e.g., a free item, or an item at a discounted price), and may notify the player of the incentive requirements that the player is to satisfy before he may receive the digital incentive. For example, the message 902 may inform the player that Starbucks™ appreciates him as a customer, and may inform the player that he has been chosen to receive a free drink from Starbucks™ if he visits a local Starbucks™ coffee shop within the next twenty four hours. Further, the message 902 may inform the player of precise instructions as to how he may satisfy the incentive requirements. As an example, the message 902 may inform the player that to receive a voucher for the free drink, he may need to sign into the virtual game using the client device 104 while he is physically located at the Starbucks™ coffee shop.

The buttons 904 and 906 presented with the user interface 900 may allow the player to accept or dismiss the incentive notification. For example, the button 904 may allow the player to accept the notification, which may cause the game networking system 108.2 to update the player's profile information so that it indicates that the player has been informed about the incentive. Further, the button 906 may allow the player to dismiss the invitation to this flash sale transaction without acknowledging that he has read the incentive notification. In some example embodiments, if the player presses the button 904 to accept the notification, the game networking system 108.2 may not present the player with the user interface 900 at a later date. However, if the player presses the button 906 to dismiss the notification, the game networking system 108.2 may remind the player of the digital incentive at a later date by presenting the user interface 900 to the player.

Figure 10:
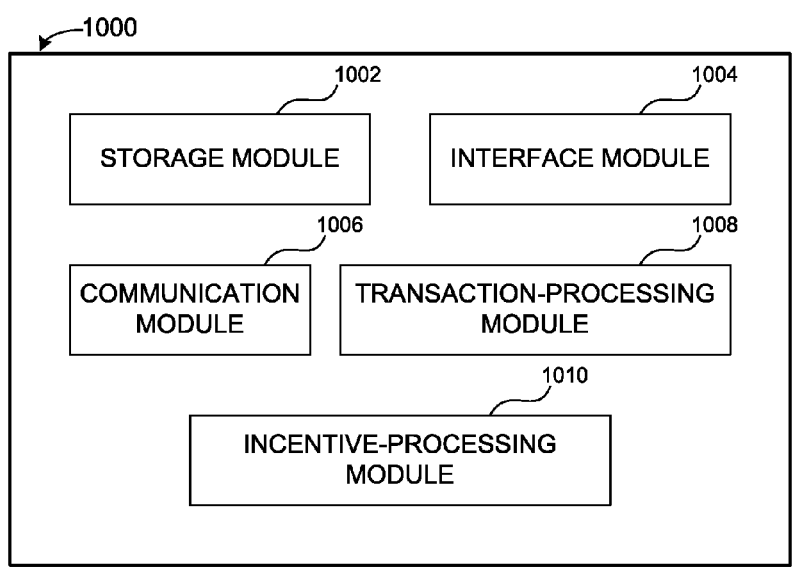
FIG. 10 illustrates an example apparatus, in accordance with various example embodiments.

FIG. 10 illustrates an example apparatus 1000, in accordance with various example embodiments. The apparatus 1000 may include a storage module 1002, an interface module 1004, a communication module 1006, a transaction-processing module 1008, and an incentive-processing module 1010.

In some example embodiments, modules 1002-1010 may be implemented using one or more application-specific integrated circuit components, microprocessors, graphics processing units (GPUs), field-programmable gate arrays (FPGAs), or any combination thereof. In other embodiments, apparatus 1000 may include a server-side computing device and/or a client side computing device, and modules 1002-1010 may include executable code that is stored within a computer-readable storage medium of apparatus 1000 and executed by a processing unit of apparatus 1000.

In some example embodiments, the storage module 1002 may correspond to the database storage 302 of FIG. 3. The storage module 1002 may store information related to the player's virtual environment, the player's game state, the player's profile information, relationship data for players of the virtual game, and flash sale transaction information for the virtual game. The flash sale transaction information may include, for example, information about an item that is for sale, information about a merchant that is selling the item, a transaction deadline for the flash sale transaction, an incentive (e.g., a virtual object) to offer to the player, and the like. The flash sale transaction information may also include requirements that are applicable to players of the virtual game. For example, the flash sale transaction information may include invitation requirements, transaction requirements, and incentive requirements for the flash sale transaction.

The interface module 1004 may generate a graphical user interface (GUI) and/or a text-based user interface to interact with the player. For example, the interface module 1004 may generate a user interface for presenting a flash sale transaction opportunity to the player, reminding the player to refer the flash sale transaction to a friend, or presenting an incentive to the player. In various examples, the user interface may include a web browser window that displays a web page that has been implemented using a combination of scripting technologies such as HTML, JavaScript, Cascading Style Sheet (CSS), ActionScript, and/or the like.

The communication module 1006 may receive the flash sale transaction details from a merchant, and may use the storage module 1002 to store the flash sale transaction details. Further, the communication module 1006 may send a flash sale invitation to the player's client device 104, and may receive an acceptance response from the player's client device 104 if the player desires to participate in the flash sale transaction.

The transaction-processing module 1008 may select a qualifying player to invite to the flash sale transaction by using the storage module 1002 to determine a player of the virtual game that satisfies the invitation requirements of the flash sale transaction. Further, the transaction-processing module 1008 may generate the invitation request for the qualifying player based on the transaction details for the flash sale transaction. The transaction-processing module 1008 may also use the communication module 1006 to provide the invitation request to the qualifying player.

The incentive-processing module 1010 may monitor actions performed by the player to determine whether the player's actions satisfy the incentive requirements. For example, the incentive-processing module 1010 may monitor the player's actions based on event notifications received from the player's client device 104 by the communication module 1006, or based on information stored in the storage module 1002. Then, the incentive-processing module 1010 may provide the award to the player based on the determining that the player has satisfied the incentive requirements.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to the Player 201. As used herein, the terms "player" and "user" can be used interchangeably and can refer to any user in an online multiuser game system or social networking system. As used herein, the term "friend" can mean any node within a player's social network.

As shown in FIG. 2, the Player 201 has direct connections with several friends. When the Player 201 has a direct connection with another individual, that connection is referred to as a first-degree friend. In out-of-game social network 250, the Player 201 has two first-degree friends. That is, the Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that the Player 201 has three second-degree friends to which he is connected via his connection to his first-degree friends. Second-degree Friend $1_2$ 212 and Friend $2_2$ 222 are connected to the Player 201 via his first-degree Friend $1_1$ 211. The limit on the depth of friend connections, or the number of degrees of separation for associations, that the Player 201 is allowed is typically dictated by the restrictions and policies implemented by the social networking system 108.1.

In various embodiments, the Player 201 can have Nth-degree friends connected to him through a chain of intermediary degree friends as indicated in FIG. 2. For example, Nth-degree Friend $1_N$ 219 is connected to the Player 201 within in-game social network 260 via second-degree Friend $3_2$ 232 and one or more other higher-degree friends.

In some embodiments, a player (or player character) may have a social graph within an online multiplayer game that is maintained by the game engine and another social graph maintained by a separate social networking system. FIG. 2 depicts an example of in-game social network 260 and out-of-game social network 250. In this example, the Player 201 has out-of-game connections 255 to a plurality of friends, forming out-of-game social network 250. Here, Friend $1_1$ 211 and Friend $2_1$ 221 are first-degree friends with the Player 201 in his out-of-game social network 250. The Player 201 also has in-game connections 265 to a plurality of players, forming in-game social network 260. Here, Friend $2_1$ 221, Friend $3_1$ 231, and Friend $4_1$ 241 are first-degree friends with the Player 201 in his in-game social network 260. In some embodiments, a game engine can access in-game social network 260, out-of-game social network 250, or both.

In some embodiments, a player (or player character) may have a social graph within an online multiplayer game that is maintained by the game engine and another social graph maintained by a separate social networking system. FIG. 2 depicts an example of in-game social network 260 and out-of-game social network 250. In this example, the Player 201 has out-of-game connections 255 to a plurality of friends, forming out-of-game social network 250. Here, Friend $1_1$ 211 and Friend $2_1$ 221 are first-degree friends with the Player 201 in his out-of-game social network 250. The Player 201 also has in-game connections 265 to a plurality of players, forming in-game social network 260. Here, Friend $2_1$ 221, Friend $3_1$ 231, and Friend $4_1$ 241 are first-degree friends with the Player 201 in his in-game social network 260. Friend 4, 242 is a second-degree friend of the Player 201. In some embodiments, a game engine can access in-game social network 260, out-of-game social network 250, or both.

Figure 11:
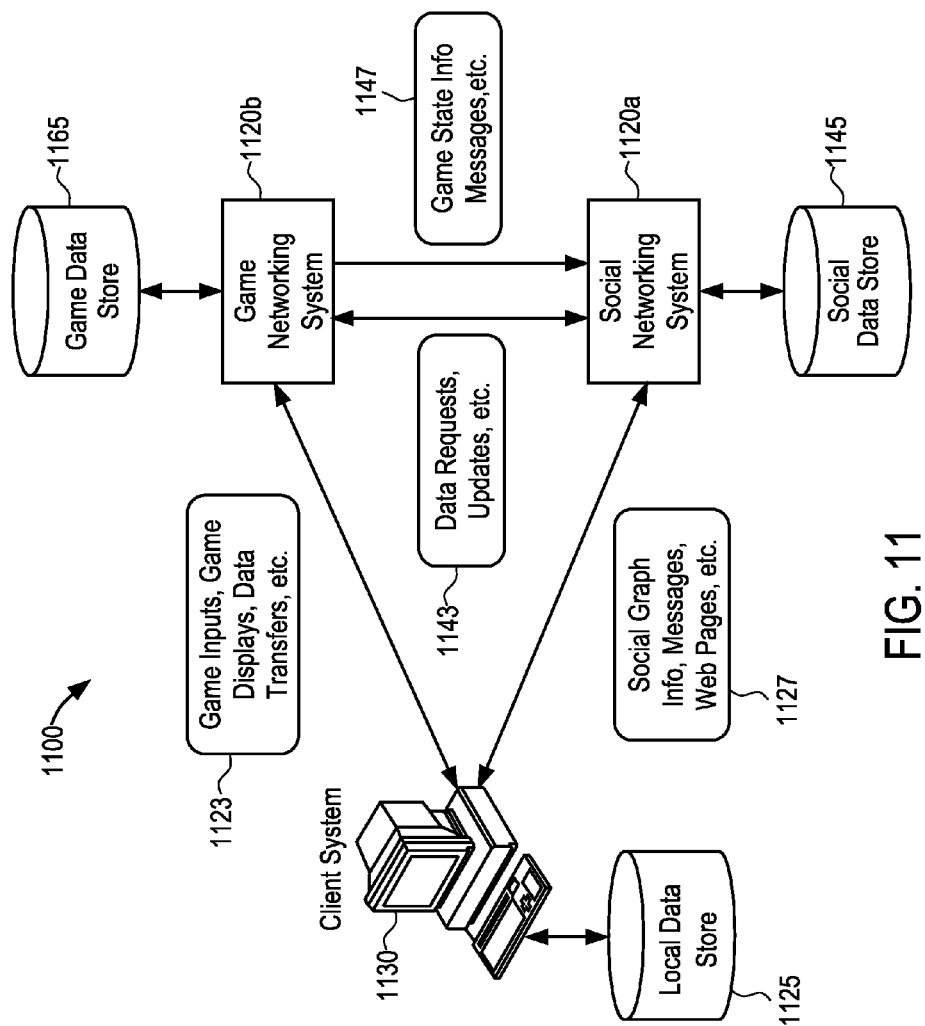
FIG. 11 illustrates an example data flow between the components of a system.

FIG. 11 illustrates an example data flow between the components of an example system 1100. In particular embodiments, the system 1100 can include a client system 1130, a social networking system 1120a, and a game networking system 1120b. The components of system 1100 can be connected to each other in any suitable configuration, using any suitable type of connection. The components may be connected directly or over any suitable network. The client system 1130, the social networking system 1120a, and the game networking system 1120b can each have one or more corresponding data stores such as a local data store 1125, a social data store 1145, and a game data store 1165, respectively. The social networking system 1120a and the game networking system 1120b can also have one or more servers that can communicate with the client system 1130 over an appropriate network. The social networking system 1120a and the game networking system 1120b can have, for example, one or more internet servers for communicating with the client system 1130 via the Internet. Similarly, the social networking system 1120a and the game networking system 1120b can have one or more mobile servers for communicating with the client system 1130 via a mobile network (e.g., GSM, PCS, Wi-Fi, WPAN, etc.). In some embodiments, one server may be able to communicate with the client system 1130 over both the Internet and a mobile network. In other embodiments, separate servers can be used.

The client system 1130 can receive and transmit data 1123 to and from the game networking system 1120b. Data 1123 may include, for example, web pages, messages, game inputs, game displays, HTTP packets, data requests, transaction information, updates, and other suitable data. At some other time, or at the same time, the game networking system 1120b can communicate data 1143, 1147 (e.g., game state information, game system account information, page info, messages, data requests, updates, etc.) with other networking systems, such as the social networking system 1120a (e.g., Facebook, Myspace, etc.). The client system 1130 can also receive and transmit data 1127 to and from the social networking system 1120a. Data 1127 may include, for example, web pages, messages, social graph information, social network displays, HTTP packets, data requests, transaction information, updates, and other suitable data.

Communication between the client system 1130, the social networking system 1120a, and the game networking system 1120b can occur over any appropriate electronic communication medium or network using any suitable communications protocols. For example, the client system 1130, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

With a client-server environment in which the virtual games may run, one server system, such as the game networking system 1120b, may support multiple client systems 1130. At any given time, there may be multiple players at multiple client systems 1130 all playing the same virtual game. In practice, the number of players playing the same game at the same time may be very large. As the game progresses with each player, multiple players may provide different inputs to the virtual game at their respective client systems 1130, and multiple client systems 1130 may transmit multiple player inputs and/or game events to the game networking system 1120b for further processing. In addition, multiple client systems 1130 may transmit other types of application data to the game networking system 1120b.

In particular embodiments, a computed-implemented game may be a text-based or turn-based game implemented as a series of web pages that are generated after a player selects one or more actions to perform. The web pages may be displayed in a browser client executed on the client system 1130. As an example and not by way of limitation, a client application downloaded to the client system 1130 may operate to serve a set of web pages to a player. As another example and not by way of limitation, a computer-implemented game may be an animated or rendered game executable as a stand-alone application or within the context of a web page or other structured document. In particular embodiments, the computer-implemented game may be implemented using Flash-based technologies. As an example and not by way of limitation, a virtual game may be fully or partially implemented as a Shockwave Flash (SWF) object that is embedded in a web page and executable by a Flash® media player plug-in. In particular embodiments, one or more described web pages may be associated with or accessed by the social networking system 1120a. This disclosure contemplates using any suitable application for the retrieval and rendering of structured documents hosted by any suitable network-addressable resource or website.

In particular embodiments, one or more objects of the virtual game may be represented as a Flash object. Flash may manipulate vector and raster graphics, and supports bidirectional streaming of audio and video. "Flash" may mean the authoring environment, the player, or the application files. In particular embodiments, the client system 1130 may include a Flash client. The Flash client may be configured to receive and run Flash application or game object code from any suitable networking system (such as, for example, the social networking system 1120a or the game networking system 1120b). In particular embodiments, the Flash client may be run in a browser client executed on the client system 1130. A player can interact with Flash objects using the client system 1130 and the Flash client. The Flash objects can represent a variety of in-game objects. Thus, the player may perform various in-game actions on various in-game objects by making various changes and updates to the associated Flash objects.

In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure describes performing any suitable in-game action by interacting with any suitable Flash object. In particular embodiments, when the player makes a change to a Flash object representing an in-game object, the client-executed game logic may update one or more game state parameters associated with the in-game object.

To ensure synchronization between the Flash object shown to the player at the client system 1130, the Flash client may send the events that caused the game state changes to the in-game object to the game networking system 1120b. However, to expedite the processing and hence the speed of the overall gaming experience, the Flash client may collect a batch of some number of events or updates into a batch file. The number of events or updates may be determined by the Flash client dynamically or determined by the game networking system 1120b based on server loads or other factors. For example, the client system 1130 may send a batch file to the game networking system 1120b whenever 50 updates have been collected or after a threshold period of time, such as every minute.

In particular embodiments, when the player 102 plays the virtual game on the client system 1130, the game networking system 1120b may serialize all the game-related data, including, for example and without limitation, game states, game events, user inputs, for this particular user and this particular game into a binary large object (BLOB) and store the BLOB in a database. The BLOB may be associated with an identifier that indicates that the BLOB contains the serialized game-related data for a particular player and a particular virtual game. In particular embodiments, while a player is not playing the virtual game, the corresponding BLOB may be stored in the database. This enables a player to stop playing the game at any time without losing the current state of the game the player is in. When a player resumes playing the game next time, game networking system 1120b may retrieve the corresponding BLOB from the database to determine the most-recent values of the game-related data. In particular embodiments, while a player is playing the virtual game, the game networking system 1120b may also load the corresponding BLOB into a memory cache so that the game system may have faster access to the BLOB and the game-related data contained therein.

In particular embodiments, one or more described web pages may be associated with a networking system or networking service. However, alternate embodiments may have application to the retrieval and rendering of structured documents hosted by any type of network addressable resource or website. Additionally, as used herein, a user may be an individual, a group, or an entity (such as a business or third-party application).

Figure 12:
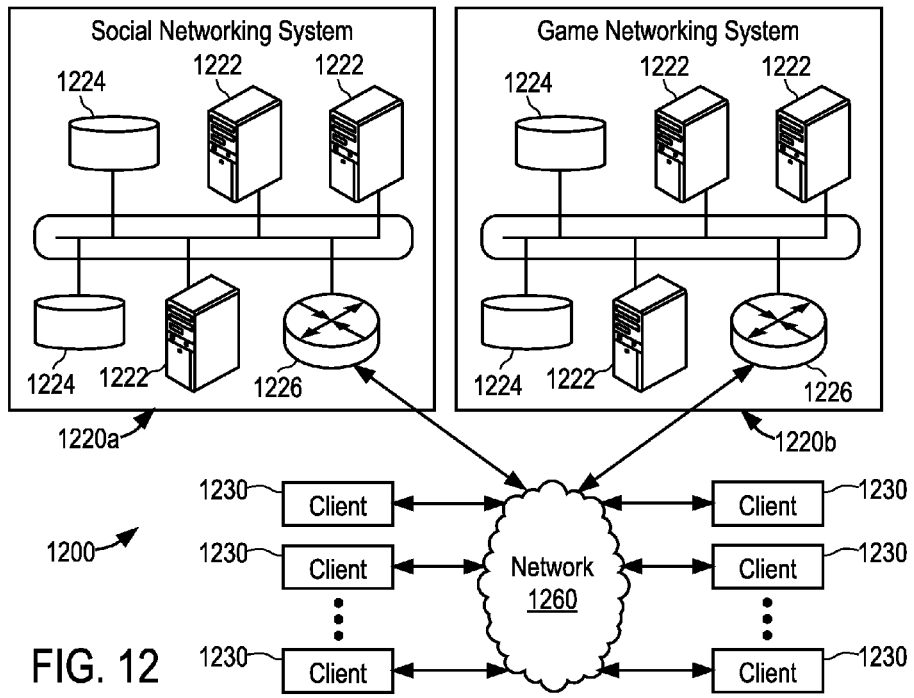
FIG. 12 illustrates an example network environment, in which various example embodiments may operate.

Particular embodiments may operate in a wide area network environment, such as the Internet, including multiple network addressable systems. FIG. 12 illustrates an example network environment 1200 in which various example embodiments may operate. The network environment 1200 may include a network cloud 1260 that generally represents one or more interconnected networks, over which the systems and hosts described herein can communicate. The network cloud 1260 may include packet-based wide area networks (such as the Internet), private networks, wireless networks, satellite networks, cellular networks, paging networks, and the like. As FIG. 12 illustrates, particular embodiments may operate in the network environment 1200 comprising one or more networking systems, such as a social networking system 1220a, a game networking system 1220b, and one or more client systems 1230. The components of the social networking system 1220a and the game networking system 1220b operate analogously; as such, hereinafter they may be referred to simply as the networking system 1220. The client systems 1230 are operably connected to the network environment 1200 via a network service provider, a wireless carrier, or any other suitable means.

The networking system 1220 is a network addressable system that, in various example embodiments, comprises one or more physical servers 1222 and data stores 1224. The one or more physical servers 1222 are operably connected to network cloud 1260 via, by way of example, a set of routers and/or networking switches 1226. In an example embodiment, the functionality hosted by the one or more physical servers 1222 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

The network environment 1200 may include physical servers 1222 that may host functionality directed to the operations of the networking system 1220. Hereinafter the servers 1222 may be referred to as the server 1222, although the server 1222 may include numerous servers hosting, for example, the networking system 1220, as well as other content distribution servers, data stores, and databases. The network environment 1200 may also include a data store 1224 that may store content and data relating to, and enabling, operation of the networking system 1220 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, the data store 1224 corresponds to one or more of a variety of separate and integrated databases, such as relational databases and object-oriented databases, that maintain information as an integrated collection of logically related records or files stored on one or more physical systems. Structurally, data store 1224 may generally include one or more of a large class of data storage and management systems. In particular embodiments, the data store 1224 may be implemented by any suitable physical system(s) including components, such as one or more database servers, mass storage media, media library systems, storage area networks, data storage clouds, and the like. In one example embodiment, data store 1224 includes one or more servers, databases (e.g., MySQL), and/or data warehouses. The data store 1224 may include data associated with different networking system 1220 users and/or client systems 1230.

The client system 1230 is generally a computer or computing device including functionality for communicating (e.g., remotely) over a computer network. The client system 1230 may be a desktop computer, laptop computer, personal digital assistant (PDA), in- or out-of-car navigation system, smart phone or other cellular or mobile phone, or mobile gaming device, among other suitable computing devices. The client system 1230 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of the client system 1230 to enter addresses of specific network resources to be retrieved, such as resources hosted by the networking system 1220. These addresses can be URLs and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally-encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at the client system 1230 desires to view a particular web page (hereinafter also referred to as target structured document) hosted by the networking system 1220, the user's web browser, or other document rendering engine or suitable client application, formulates and transmits a request to the networking system 1220. The request generally includes a URL or other document identifier as well as metadata or other information. By way of example, the request may include information identifying the user, such as a user ID, as well as information identifying or characterizing the web browser or operating system running on the user's client system 1230. The request may also include location information identifying a geographic location of the user's client system 1230 or a logical network location of the user's client system 1230. The request may also include a timestamp identifying when the request was transmitted.

Although the example network environment 1200 described above and illustrated in FIG. 12 is described with respect to the social networking system 1220*a* and the game networking system 1220*b*, this disclosure encompasses any suitable network environment using any suitable systems. As an example and not by way of limitation, the network environment may include online media systems, online reviewing systems, online search engines, online advertising systems, or any combination of two or more such systems.

Figure 13:
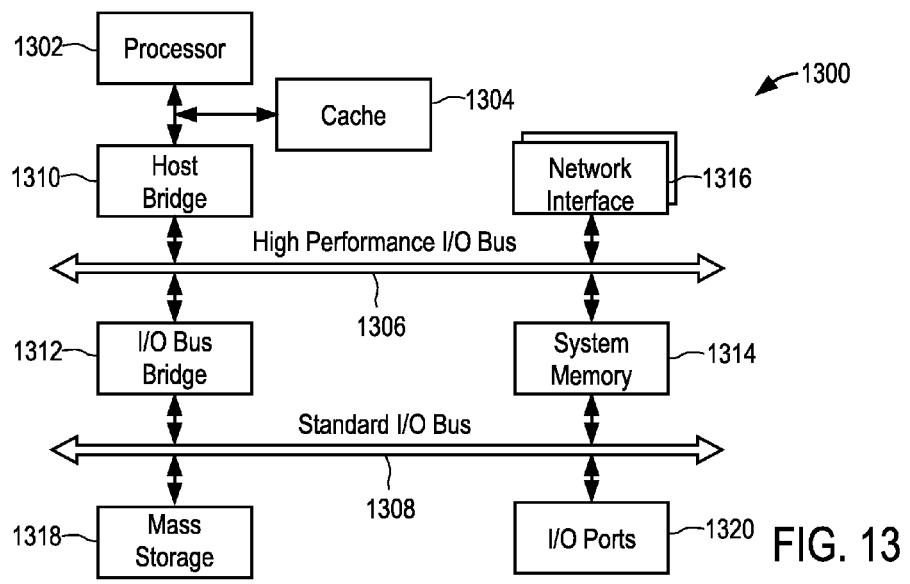
FIG. 13 illustrates an example computing system architecture, which may be used to implement a server or a client system.

FIG. 13 illustrates an example computing system architecture, which may be used to implement the server 1222 or the client system 1230. In one embodiment, a hardware system 1300 comprises a processor 1302, a cache memory 1304, and one or more executable modules and drivers, stored on a tangible computer-readable medium, directed to the functions described herein. Additionally, hardware system 1300 may include a high performance input/output (I/O) bus 1306 and a standard I/O bus 1308. A host bridge 1310 may couple the processor 1302 to a high performance I/O bus 1306, whereas an I/O bus bridge 1312 couples the two buses 1306 and 1308 to each other. A system memory 1314 and one or more network/communication interfaces 1316 may couple to the bus 1306. The hardware system 1300 may further include video memory (not shown) and a display device coupled to the video memory. A mass storage 1318 and I/O ports 1320 may couple to the bus 1308. The hardware system 1300 may optionally include a keyboard, a pointing device, and a display device (not shown) coupled to the bus 1308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1300 are described in greater detail below. In particular, the network interface 1316 provides communication between the hardware system 1300 and any of a wide range of networks, such as an Ethernet (e.g., IEEE 802.3) network, a backplane, etc. The mass storage 1318 provides permanent storage for the data and programming instructions to perform the above-described functions implemented in the servers 1222 of FIG. 12, whereas the system memory 1314 (e.g., DRAM) provides temporary storage for the data and programming instructions when executed by the processor 1302. The I/O ports 1320 are one or more serial and/or parallel communication ports that provide communication between additional peripheral devices, which may be coupled to the hardware system 1300.

The hardware system 1300 may include a variety of system architectures, and various components of the hardware system 1300 may be rearranged. For example, the cache memory 1304 may be on-chip with the processor 1302. Alternatively, the cache memory 1304 and the processor 1302 may be packed together as a "processor module," with the processor 1302 being referred to as the "processor core." Furthermore, certain embodiments of the present disclosure may not include all of the above components. For example, the peripheral devices shown coupled to the standard I/O bus 1308 may couple to the high performance I/O bus 1306. In addition, in some embodiments, only a single bus may exist, with the components of the hardware system 1300 being coupled to the single bus. Furthermore, the hardware system 1300 may include additional components, such as additional processors, storage devices, or memories.

An operating system manages and controls the operation of the hardware system 1300, including the input and output of data to and from software applications (not shown). The operating system provides an interface between the software applications being executed on the hardware system 1300 and the hardware components of the hardware system 1300. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably, and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments of the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method for performing a flash sale transaction of a computer-implemented virtual game, the method comprising:

storing flash sales transaction details received via a network from a merchant server;

in response to an event notification in a virtual game of a first player, accessing the transaction details for the flash sale transaction, the transaction details indicating at least an item for sale, invitation requirements applicable to the first player of the virtual game and including a physical location of the first player, and transaction requirements applicable to participants of the flash sale transaction, the transaction requirements including participant presence at a specified location;

based on the physical location associated with the first player, selectively providing an invitation request to the first player;

receiving an acceptance response from at least a minimum number of players of the virtual game that are needed to complete the flash sale transaction, the minimum number of players being within a social graph of the first player and having received the transaction details for the flash sale from the first player;

using at least one processor, completing the flash sale transaction based on determining that the minimum number of players have satisfied the transaction requirements and wherein the minimum number of players includes:

a second player of the virtual game that is invited to the flash sale transaction directly by the first player; and at least one third player of the virtual game that is invited to the flash sale transaction indirectly by the second player; and storing transaction data to be communicated to the merchant server, the transaction data associated with the players that have participated in the flash sale transaction.

2. The method of claim 1, wherein the invitation requirements include one or more of:
a player attribute;
a player game state;
an in-game objective that the first player has not completed;
an in-game objective that the first player has completed;
a virtual object that the first player does not own;
a virtual good that the first player consumes at or above a determinable rate;
a minimum engagement level for the first player as determined by a game engagement metric of the virtual game;
an association that the first player has with other players of the virtual game as reflected within relationship data;
flash sales previously accepted by the first player;
a speed at which the invitation request was propagated in the virtual game; and
a speed at which friends of the player responded to the invitation request.

3. The method of claim 1, wherein the transaction requirements include one or more of:
a minimum number of friends, as reflected within relationship data, that the first player is to refer to the flash sale transaction;
a minimum propagation depth, as reflected within the relationship data, to which at least one referral from the first player is to propagate;
a physical location that the first player is to visit; and
an in-game objective that the first player is to complete.

4. The method of claim 1, wherein the selectively providing of the invitation request to the first player comprises:
selecting a qualifying player that satisfies the invitation requirements of the flash sale transaction;
generating the invitation request for the qualifying player based on the transaction details for the flash sale transaction, the invitation request indicating that the player is invited to participate in the flash sale transaction; and
providing the invitation request to the qualifying player.

5. The method of claim 4, wherein the selecting of the qualifying player comprises determining that the qualifying player has at least one player attribute in common with one or more participants of the flash sale transaction.

6. The method of claim 4, wherein the selecting of the qualifying player comprises determining that the qualifying player has a play pattern similar to one or more participants of the flash sale transaction as determined by a play pattern metric.

7. The method of claim 1, wherein the transaction details further include an incentive identifier for an award to offer to the first player, and incentive requirements applicable to the first player.

8. The method of claim 7, further comprising:
monitoring an action performed by the first player;
determining that the first player's action satisfies the incentive requirements; and
providing the award to the first player based on the determining that the player has satisfied the incentive requirements.

9. The method of claim 7, further comprising:
associating a first participant and a second participant of the flash sale transaction with an in-game objective of the virtual game; and
generating incentive requirements indicating that the first and second participants are to complete the in-game objective before an expiration date of the incentive.

10. The method of claim 7, wherein the incentive requirements include one or more of:
a minimum number of flash sale referrals that the first player is to send to other players of the virtual game;
a minimum engagement level for the first player as determined by a game engagement metric of the virtual game;
a physical location that the first player is to visit; and
an in-game objective that the first player is to complete in response to participating in the flash sale transaction.

11. An apparatus to facilitate performing a flash sale transaction of a computer-implemented virtual game, the apparatus comprising:
a storage module to store transaction details for the flash sale transaction received from a merchant server, the transaction details indicating at least an item for sale, invitation requirements applicable to a first player of the virtual game and including a physical location of the first player, and transaction requirements applicable to participants of the flash sale transaction, the transaction requirements including participant presence at a specified location;
a transaction-processing module to selectively provide, based on physical location associated with the first player, an invitation request to the first player of the virtual game; and
a communication mechanism to receive an acceptance response from at least a minimum number of players of the virtual game that are needed to complete the flash sale transaction, the minimum number of players being within a social graph of the first player and having received the transaction details for the flash sale from the first player, the transaction-processing module being further configured to complete the flash sale transaction based on determining that the minimum number of players have satisfied the transaction requirements and store transaction data to be communicated to the merchant server, the transaction data associated with the players that have participated in the flash sale transaction, wherein the minimum number of players includes:
a second player of the virtual game that is invited to the flash sale transaction directly by the first player; and
at least one third player of the virtual game that is invited to the flash sale transaction indirectly by the second player.

12. The apparatus of claim 11, wherein the invitation requirements include one or more of:
a player attribute;

a player game state;
an in-game objective that the first player has not completed;
an in-game objective that the first player has completed;
a virtual object that the first player does not own;
a virtual good that the first player consumes at or above a determinable rate;
a minimum engagement level for the first player as determined by a game engagement metric of the virtual game; and
an association that the first player has with other players of the virtual game as reflected within relationship data.

13. The apparatus of claim 11, wherein the transaction requirements include one or more of:
a minimum number of friends, as reflected within relationship data, that the first player is to refer to the flash sale transaction;
a minimum propagation depth, as reflected within the relationship data, to which at least one referral from the first player is to propagate;
a physical location that the first player is to visit; and
an in-game objective that the first player is to complete.

14. The apparatus of claim 11, wherein the selectively providing of the invitation request to the first player comprises:
selecting a qualifying player that satisfies the invitation requirements of the flash sale transaction;
generating the invitation request for the qualifying player based on the transaction details for the flash sale transaction, the invitation request indicating that the player is invited to participate in the flash sale transaction; and
using the communication module to provide the invitation request to the qualifying player.

15. The apparatus of claim 14, wherein the selecting of the qualifying player comprises determining that the qualifying player has at least one player attribute in common with one or more participants of the flash sale transaction.

16. The apparatus of claim 14, wherein the selecting of the qualifying player comprises determining that the qualifying player has a play pattern similar to one or more participants of the flash sale transaction as determined by a play pattern metric.

17. The apparatus of claim 11, wherein the transaction details further include an incentive identifier for an award to offer to the first player, and incentive requirements applicable to the first player.

18. The apparatus of claim 17, further comprising an incentive-processing module to:
monitor action performed by the first player;
determine that the first player's action satisfies the incentive requirements; and
provide the award to the first player based on the determining that the player has satisfied the incentive requirements.

19. The apparatus of claim 17, further comprising an incentive-processing module to:
associate a first participant and a second participant of the flash sale transaction with an in-game objective of the virtual game; and
generate incentive requirements indicating that the first and second participants are to complete the in-game objective before an expiration date of the incentive.

20. The apparatus of claim 17, wherein the incentive requirements include one or more of:
a minimum number of flash sale referrals that the first player is to send to other players of the virtual game;
a minimum engagement level for the first player as determined by a game engagement metric of the virtual game;
a physical location that the first player is to visit; and
an in-game objective that the first player is to complete in response to participating in the flash sale transaction.

21. The apparatus of claim 11, wherein payment for a flash sale transaction is authenticated out-of-band using a telephone-based payment authentication technique.

22. The apparatus of claim 11, wherein the flash sale transaction is auctioned to a plurality of advertisers.

23. The apparatus of claim 11, wherein a graphical user interface (GUI) is provided with a "flash sale inbox icon" to allow a player to defer responding to an invitation request.

24. A non-transitory computer readable storage medium storing instructions, which when executed using one or more processors performs operations for facilitating the processing of a flash sale transaction, the operations comprising:
storing flash sales transaction details received via a network from a merchant server;
in response to an event notification in a virtual game of a first player, accessing the transaction details for the flash sale transaction, the transaction details indicating at least an item for sale, invitation requirements applicable to the first player of the virtual game and including a physical location of the first player, and transaction requirements applicable to participants of the flash sale transaction, the transaction requirements including participant presence at a specified location;
based on the physical location associated with the first player, selectively providing an invitation request to the first player;
receiving an acceptance response from at least a minimum number of players of the virtual game that are needed to complete the flash sale transaction, the minimum number of players being within a social graph of the first player and having received the transaction details for the flash sale from the first player;
using at least one processor, completing the flash sale transaction based on determining that the minimum number of players have satisfied the transaction requirements and wherein the minimum number of players includes:
a second player of the virtual game that is invited to the flash sale transaction directly by the first player; and
at least one third player of the virtual game that is invited to the flash sale transaction indirectly by the second player; and
storing transaction data to be communicated to the merchant server, the transaction data associated with the players that have participated in the flash sale transaction.

25. The storage medium of claim 24, wherein the invitation requirements include:
a player attribute;
a player game state;
an in-game objective that the first player has not completed;
an in-game objective that the first player has completed;
a virtual object that the first player does not own;
a virtual good that the first player consumes at or above a determinable rate;
a minimum engagement level for the first player as determined by a game engagement metric of the virtual game; and
an association that the first player has with other players of the virtual game as reflected within relationship data.

26. The storage medium of claim 24, wherein the transaction requirements:

a minimum number of friends, as reflected within relationship data, that the first player is to refer to the flash sale transaction;

a minimum propagation depth, as reflected within the relationship data, to which at least one referral from the first player is to propagate;

a physical location that the first player is to visit; and an in-game objective that the first player is to complete.

27. The storage medium of claim 24, wherein the selectively providing of the invitation request to the first player comprises:

selecting a qualifying player that satisfies the invitation requirements of the flash sale transaction;

generating the invitation request for the qualifying player based on the transaction details for the flash sale transaction, the invitation request indicating that the player is invited to participate in the flash sale transaction; and providing the invitation request to the qualifying player.

28. The storage medium of claim 24, wherein the transaction details further include a physical location that the first player is to visit.

* * * * *